(12) United States Patent
Zaschke et al.

(10) Patent No.: US 8,106,121 B2
(45) Date of Patent: Jan. 31, 2012

(54) GRAFT POLYOLS WITH A BIMODAL PARTICLE SIZE DISTRIBUTION AND METHOD FOR PRODUCING GRAFT POLYOLS OF THIS TYPE, IN ADDITION TO THE USE THEREOF FOR PRODUCING POLYURETHANES

(75) Inventors: Bernd Zaschke, Schoenfeld (DE); Andreas Hoppe, Lauta (DE); Marita Schuster, Stemwede-Haldem (DE); Marion Wenzel, Stemwede-Haldem (DE); Klaus Wagner, Wagenfeld (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1220 days.

(21) Appl. No.: 10/507,315

(22) PCT Filed: Mar. 13, 2003

(86) PCT No.: PCT/EP03/02576
§ 371 (c)(1),
(2), (4) Date: Sep. 10, 2004

(87) PCT Pub. No.: WO03/078496
PCT Pub. Date: Sep. 25, 2003

(65) Prior Publication Data
US 2005/0222361 A1 Oct. 6, 2005

(30) Foreign Application Priority Data
Mar. 15, 2002 (DE) .................................. 102 11 669

(51) Int. Cl.
*C08G 18/28* (2006.01)
(52) U.S. Cl. ........ 524/762; 521/134; 521/137; 521/170; 521/174; 521/176; 524/377; 524/504; 524/765; 524/766; 525/123; 525/404; 525/412
(58) Field of Classification Search .................. 521/134, 521/137, 170, 174, 176; 524/377, 504, 762, 524/765, 766; 525/123, 404, 412
See application file for complete search history.

(56) References Cited

U.S. PATENT DOCUMENTS

| | | | |
|---|---|---|---|
| 4,436,843 A | 3/1984 | Rowton et al. | |
| 4,593,051 A | 6/1986 | Koleske | |
| 4,814,360 A | 3/1989 | McBrayer | |
| 5,268,418 A | 12/1993 | Simroth | |
| 5,488,085 A * | 1/1996 | Hayes et al. | 525/53 |
| 5,739,173 A | 4/1998 | Lutter et al. | |
| 5,814,699 A * | 9/1998 | Kratz et al. | 525/53 |
| 6,013,731 A | 1/2000 | Holeschovsky et al. | |
| 6,034,148 A | 3/2000 | Kelly et al. | |
| 6,127,443 A | 10/2000 | Perry et al. | |
| 6,201,035 B1 | 3/2001 | Fishback et al. | |
| 6,355,760 B1 | 3/2002 | Papon et al. | |

FOREIGN PATENT DOCUMENTS

| | | |
|---|---|---|
| DE | 1 111 394 | 7/1961 |
| DE | 1 152 536 | 8/1963 |
| DE | 1 152 537 | 8/1963 |
| DE | 1 222 669 | 8/1966 |
| DE | 38 44 048 | 7/1990 |
| EP | 365 986 | 5/1990 |
| EP | 640 633 | 3/1995 |
| EP | 698 628 | 2/1996 |
| EP | 786 480 | 7/1997 |
| WO | 00/05971 | 2/2000 |
| WO | 02/66533 | 8/2002 |

OTHER PUBLICATIONS

U.S. Appl. No. 11/547,259, filed Oct. 4, 2006, Emge, et al.

* cited by examiner

*Primary Examiner* — John Cooney
(74) *Attorney, Agent, or Firm* — Oblon, Spivak, McClelland, Maier & Neustadt, L.L.P.

(57) ABSTRACT

The invention relates to graft polyols with a bimodal particle size distribution and a total solid content of between 5 and 65 wt. %. Said polyols contain small particles with a particle diameter of between 0.05 and 0.7 μm and large particles with a particle diameter of between 0.4 and 5.0 μm, whereby the peaks of the large and small particles measured during a representation according to the light-scattering analysis method do not overlap. The total solid content with the defined particle sizes consists of a volumetric fraction of between 5 and 45% small particles and a volumetric fraction of between 95 and 55% large particles, said volumetric fractions totalling 100%. The invention also relates to a method for producing graft polyols of this type and to the use thereof for producing polyurethanes.

15 Claims, 5 Drawing Sheets

Figure 1: Graft polyols having a broad particle size distribution (in some cases with a shoulder)
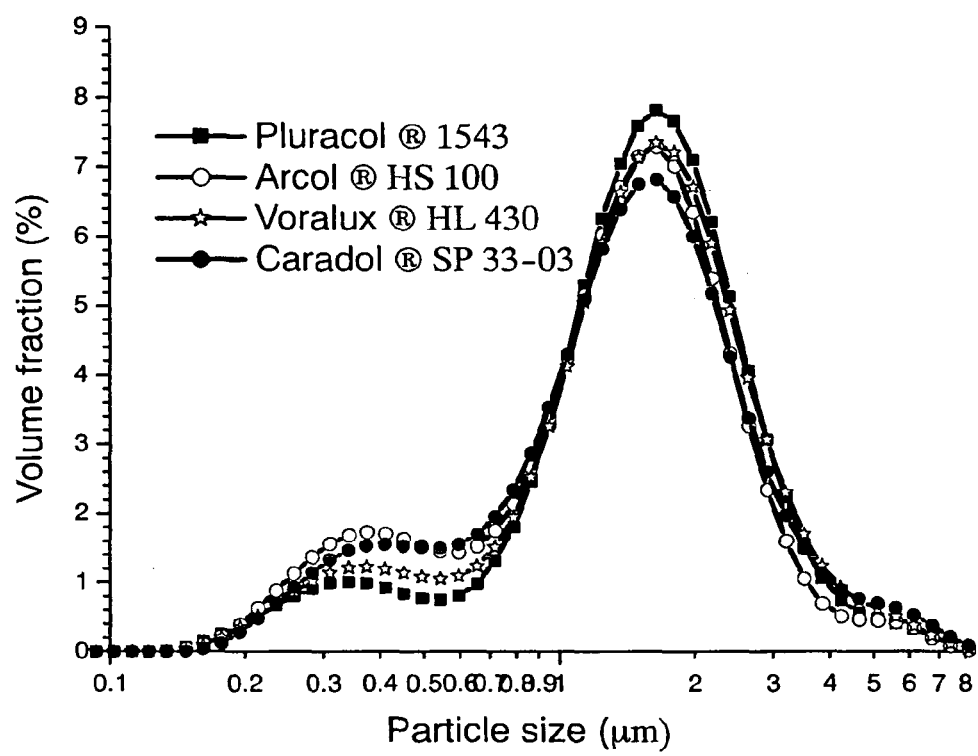

Figure 2: Graft polyols having a substantially separated, bimodal particle size distribution in which the volume fraction of small particles is > 70%
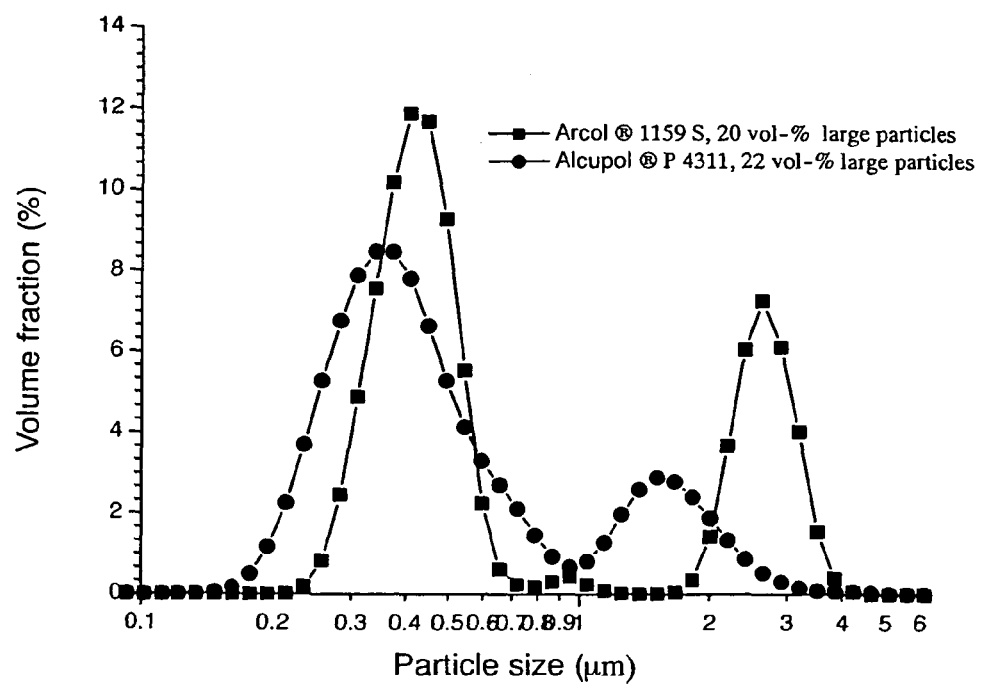

Figure 3: Graft polyols having a novel bimodal particle size distribution
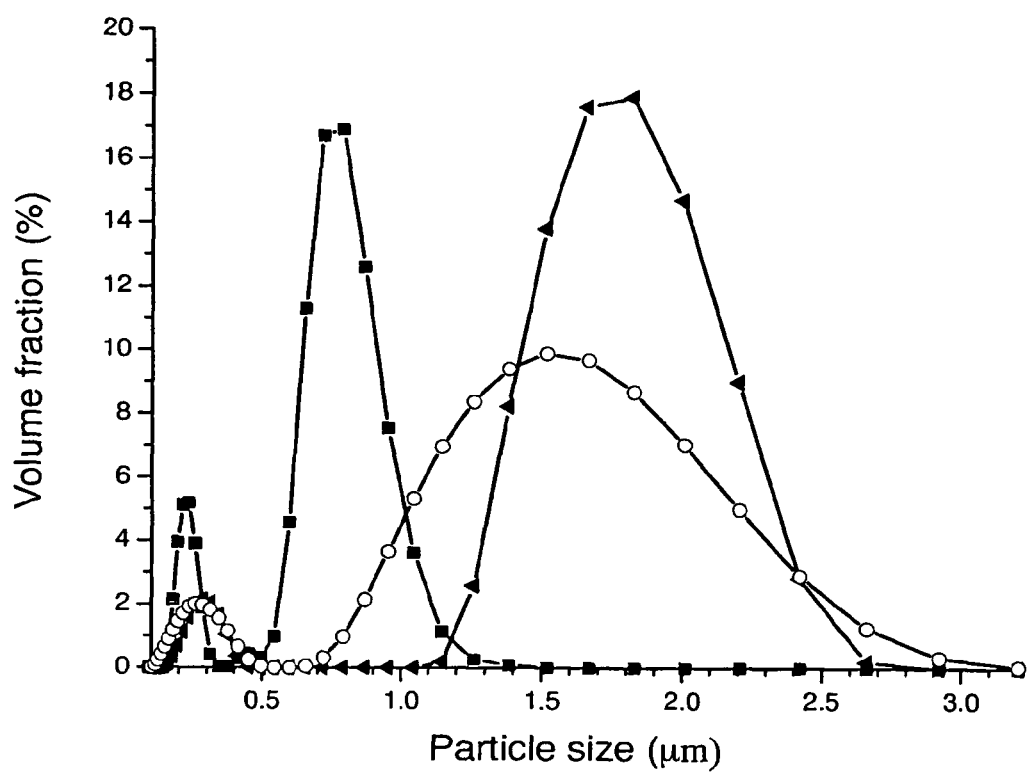

Figure 4: Graft polyols having a narrow, monomodal particle size distribution
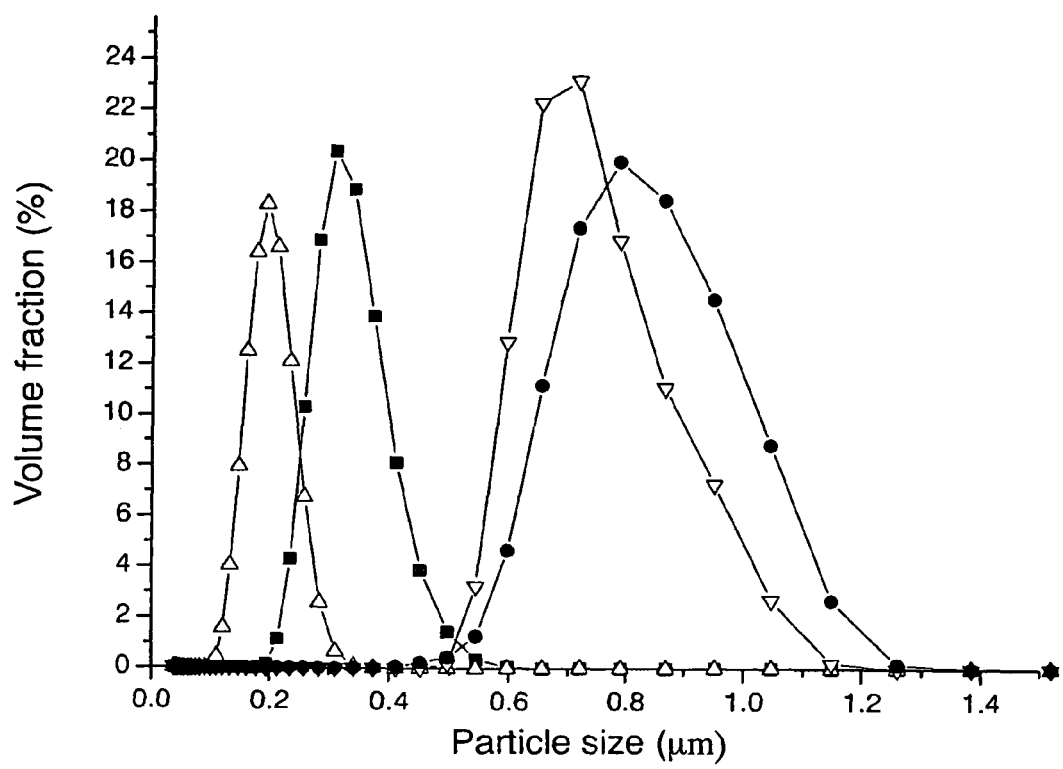

Figure 5: Viscosity of graft polyols in dependence of content of small and large particles
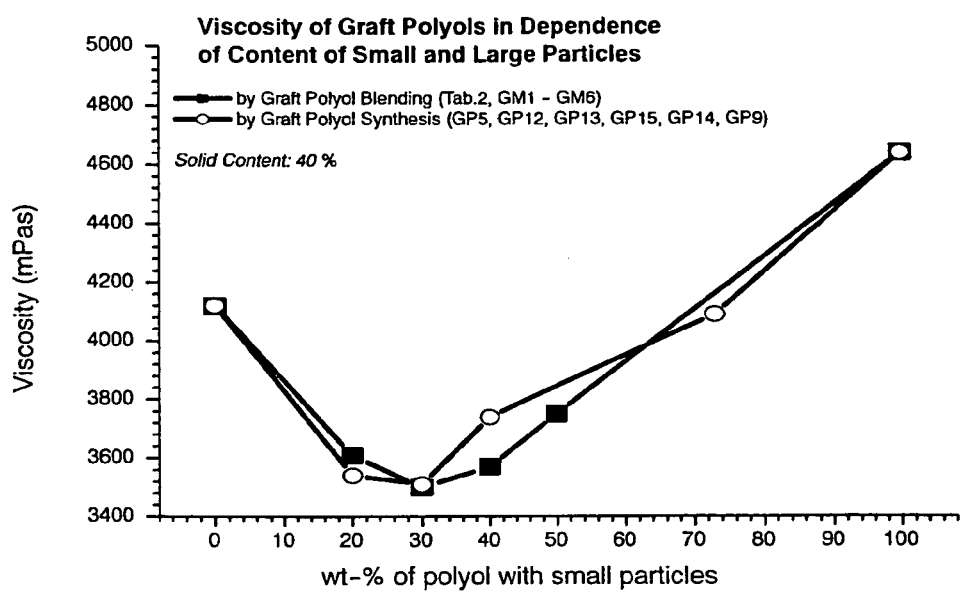

GRAFT POLYOLS WITH A BIMODAL PARTICLE SIZE DISTRIBUTION AND METHOD FOR PRODUCING GRAFT POLYOLS OF THIS TYPE, IN ADDITION TO THE USE THEREOF FOR PRODUCING POLYURETHANES

The present invention relates to graft polyols having a bimodal particle size distribution and processes for the preparation of such graft polyols and their use for the preparation of polyurethanes.

Graft polyols, also referred to as polymer polyols, are dispersions of acrylonitrile/styrene copolymers in a polyetherol or polyesterol. By using graft polyols in the preparation of polyurethane foams, the foaming behavior, in particular the cell opening behavior, can be advantageously influenced. Owing to the dispersed phase of the solids in the graft polyol, the hardness of the polyurethane foams is increased compared with foams prepared without graft polyols.

Graft polyols are prepared by free radical polymerization of the monomers acrylonitrile, styrene and optionally further monomers, a macromer and a moderator and with the use of a free radical initiator, generally azo or peroxide compounds, in a polyetherol or a polyesterol as the continuous phase.

This is usually an in situ polymerization of acrylonitrile, styrene or preferably mixtures of styrene and acrylonitrile, for example in a weight ratio of from 90:10 to 10:90, preferably from 70:30 to 30:70, analogously to the data in German patents 1111394, 1222669 (U.S. Pat. Nos. 3,304,273, 3,383,351, 3,523,093), 1152536 (GB 1040452) and 1152537 (GB 987618).

Compounds having at least a hydroxyl group functionality of from 2 to 8, preferably from 2 to 6, and an average molecular weight of from 300 to 8 000, preferably from 300 to 5 000, are used as carrier polyols. The hydroxyl number of the polyhydroxy compounds is as a rule from 20 to 160, preferably from 28 to 70.

Graft polyols are prepared in continuous processes, with the use of stirred kettles having a continuous feed and discharge, stirred kettle cascades, tubular reactors and loop reactors having continuous feed and discharge, or in batchwise processes, by means of a batch reactor or a semibatch reactor.

In the semibatch process, only a part of the raw materials, the initially taken reaction mixture, is initially taken in the reactor. The remaining raw materials are transferred to the reactor in one or more metered streams during the reaction. The course of the reaction, such as the removal of the heat of reaction and the particle formation, can be better controlled by means of the semibatch procedure. Usually, in the preparation of graft polyols in the semibatch process, the remaining raw materials are metered into the reactor in the course of from 60 to 300 minutes, followed by a postreaction time of from 5 to 45 minutes.

The use of graft polyols in the preparation of polyurethanes is desirable owing to the special properties of the graft polyols for many applications, for example for the upholstered furniture industry and automotive industry. However, these applications require low-viscosity graft polyols which, when used in polyurethane systems, have good cell opening behavior and flow behavior in the foam mold.

A large part of the graft polyols available on the market has a broad particle size distribution. The particle size distributions of these graft polyols, when measured by the light scattering method, have a shoulder in some cases, which indicates a superposition of peaks having different particle size (cf. FIG. 1).

Graft polyols having a broad particle size distribution are usually prepared in continuous processes (WO 00/5971, U.S. Pat. No. 6,013,731, EP 0640633, U.S. Pat. No. 5,268,418, EP 365986). If two-stage processes are used, one of the two stages may also be a semibatch process.

EP-B-698628 describes a process for the preparation of graft polyols having a broad particle size distribution. The characteristic feature of this process is that a graft polyol whose solids content contributes only from 0.25 to 3.0% by weight to the solids content of the resulting graft polyol is used in the initially taken reaction mixture, in addition to a carrier polyol, stabilizer and isopropanol.

EP-A-0786480 describes a process for the preparation of graft polyols having a narrow particle size distribution, in which process the initially taken reaction mixture consists of a carrier polyol, stabilizer and a graft polyol, more than 80% of the solids content of the graft polyol used in the initially taken reaction mixture being formed from the monomer styrene. In the further course of the reaction, graft polyols having a narrow particle size distribution are formed by free radical polymerization of further monomers, with a styrene content of >80% by weight, using free radical initiators.

Furthermore, graft polyols having a substantially separate, bimodal particle size distribution are also offered, for example Arcol® 1159 S and Alcupol® P 4311. These graft polyols have volume fractions of more than 70% of small particles and less than 30% of large particles (cf. FIG. 2).

Flexible polyurethane foams prepared using graft polyols having such broad particle size distributions or having bimodal particle size distributions with predominantly small particles have inadequate cell opening behavior on foaming, which leads to relatively closed-cell foams. In the preparation of polyurethane foams, special cell opener polyols, i.e. polyols having a substantially increased content of ethylene oxide groups in the polymer chain, are therefore added to the reaction mixture comprising isocyanate component and polyol component. When these cell opener polyols are used, however, the hardness of the polyurethane foams decreases.

Graft polyols having a high viscosity lead to polyol components having an increased viscosity. This may result in mixing problems with low-viscosity isocyanate components. Moreover, processing on high-pressure metering apparatuses is not possible in the case of polyol components having viscosities of more than 2 000 mPa·s.

A low viscosity of the graft polyols also leads to a low viscosity of the reaction mixture after leaving the mixing head, with the result that the reaction mixture is better distributed in the foam mold or on the foam belt. Consequently, the formation of voids and bubbles by beaten-in air, in particular in the case of complicated foam geometries (foam backing of automotive carpets: automotive seat molds, etc.), can be reduced or prevented.

Graft polyols are usually produced with a solids content of from 30 to 65% by weight. In many polyurethane applications, these high solids contents are, however, not necessary for achieving the desired property level, so that further non-solids-containing polyols are used in the polyol components. The preparation of graft polyol mixtures having a reduced solids content of graft polyols having a high filler content with non-solids-containing polyols is part of the prior art and can be carried out both by the customer and by the producer of the graft polyols. Examples for the preparation of such graft polyol mixtures are described in the following patents: U.S. Pat. No. 4,814,360, DE 3844048, U.S. Pat. No. 4,436,843.

Mixtures of two or more graft polyols are described only in a few patents. Thus, in U.S. Pat. No. 6,127,443, two polyols having different molecular weights and different functionalities are mixed with one another in order specifically to establish the functionality of the resulting mixture. At least one of these polyols is described as graft polyol.

U.S. Pat. No. 5,739,173 describes a process for the preparation of flameproof flexible polyurethane foams, in which an isocyanate component and a polyol component are reacted. The polyol component consists of polyetherols, flameproofing agents, stabilizers and blowing agents and may also contain one or more graft polyols.

U.S. Pat. No. 6,034,148 describes a process for the preparation of energy-absorbing polyurethane foams, the foaming process being carried out under high pressure. The polyol component is a system which is obtained by mixing a graft polyol with conventional polyols, but also further graft polyols, the average hydroxyl number being from 50 to 90 and the average functionality from 2.0 to 2.5.

U.S. Pat. No. 4,593,051 describes a photopolymerizable mixture which consists of an epoxide-containing compound, an aromatic onium salt photoinitiator and a polymer/polyol dispersion. This polymer/polyol dispersion may also be a mixture of at least two polymer polyols.

The preparation of graft polyols having substantially separated, bimodal particle size distribution by mixing graft polyols having monomodal particle size distribution and different particle sizes has not been described to date.

It is an object of the present invention to provide graft polyols which, when used in polyurethane systems, have improved cell opening behavior and improved flow behavior in the foam mold, the preparation process thereof being intended to be very simple and economical.

We have found that this object is achieved, according to the invention, by using graft polyols having a total solids content of from 5 to 65% by weight and a bimodal particle size distribution, containing defined small particles and defined large particles, which are substantially separate from one another, the total content of solids having the defined particle sizes consisting of a volume fraction of from 5 to 45% of small particles and a volume fraction of from 95 to 55% of large particles, these volume fractions summing to 100%.

The present invention thus relates to graft polyols having a bimodal particle size distribution and a total solids content of from 5 to 65% by weight, containing small particles having a diameter of from 0.05 to 0.7 μm and large particles having a diameter of from 0.4 to 5.0 μm, the peaks of the large and small particles measured by the light scattering method not overlapping, and a total content of solids having the defined particle sizes consisting of a volume fraction of from 5 to 45% of small particles and a volume fraction of from 95 to 55% of large particles, these volume fractions summing to 100%.

The present invention furthermore relates to a process for the preparation of such graft polyols having a bimodal particle size distribution, wherein at least one graft polyol having a monomodal particle size distribution with small particles which have a diameter of from 0.05 to 0.7 μm and at least one graft polyol having a monomodal particle size distribution with large particles which have a particle diameter of from 0.4 to 5.0 μm are mixed with one another in a ratio such that the total solids content of the resulting graft polyol having a bimodal particle size distribution consists of a volume fraction of from 5 to 45% of small particles and a volume fraction of from 95 to 55% of large particles, the volume fractions summing to 100%.

The present invention also relates to a semibatch process for the preparation of such graft polyols having a bimodal particle size distribution, wherein the initially taken reaction mixture contains in each case at least one carrier polyol, a macromer and a graft polyol having a monomodal particle size distribution, more than 3% by weight of the solids content in the resulting graft polyol consisting of the solids content of the graft polyol used in the initially taken reaction mixture and having a monomodal particle size distribution, and the weight of the macromer used in the initially taken reaction mixture is from 1 to 30% by weight, based on the total weight of the ethylenically unsaturated monomers used, which is at least sufficiently large that small particles are formed in the further course of the reaction.

Finally, the present invention relates to the use of such graft polyols for the preparation of polyurethanes and a process for the preparation of polyurethanes by reacting organic and/or modified organic polyisocyanates (a) with graft polyols (b) and, if required, further compounds (c) having hydrogen atoms reactive toward isocyanates, in the presence of catalysts (d), if required water and/or other blowing agents (e) and, if required, further assistants and additives (f), wherein the graft polyols (b) used are those having a bimodal particle size distribution and a total solids content of from 5 to 65% by weight, containing small particles having a diameter of from 0.05 to 0.7 μm and large particles having a diameter of from 0.4 to 5.0 μm, the peaks of the large and small particles measured by the light scattering method not overlapping, and a total content of solids having the defined particle sizes consisting of a volume fraction of from 5 to 45% of small particles and a volume fraction of from 95 to 55% of large particles, these volume fractions summing to 100%.

In our investigations, we have surprisingly found that the novel graft polyols having a pronounced bimodal particle size distribution possess a relatively low viscosity and very good processing properties. In contrast to graft polyols having a monomodal distribution or a weak bimodal particle size distribution, they exhibit improved cell opening behavior and improved flow behavior in the foam mold during foaming.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIG. 1 illustrates graft polyols having a broad particle size distribution;

FIG. 2 illustrates graft polyols having a substantially separated, bimodal particle size distribution;

FIG. 3 illustrates graft polyols having a novel bimodal particle size distribution;

FIG. 4 illustrates graft polyols having a narrow, monomodal particle size distribution; and FIG. 5 illustrates viscosity of graft polyols in dependence of content of small and large particles.

Owing to the improved cell opening behavior when these graft polyols are used, the use of cell opening polyols and other process assistants can be limited, for example in cold-curing foam formulations, which makes the formulation cheaper, excludes a possible source of metering errors and improves the foam properties. For example, improved elongations at break and tear propagation resistances during foam molding or better values for tensile strength, elongation and compression set in the case of conventional slabstock foams with increased load-bearing capacity are noteworthy.

The novel graft polyols have better flow behavior under strong shear load. Consequently, the filtration rate during purification of the graft polyols is higher for a given filter area or a smaller filter area is required for the same throughputs. In foam molds having complicated geometries (foam backing of automotive carpets, automotive seat molds, etc.), the reaction mixture flows better, leading to a reduction in void formation.

The novel graft polyols are dispersions of acrylonitrile/styrene copolymers in a polyetherol as the continuous phase.

They have a total solids content of from 5 to 65, advantageously from 10 to 50, % by weight, and a pronounced, substantially separated bimodal particle size distribution comprising small and large particles, as defined further below (cf. FIG. 3).

The volume fraction of the small particles is from 5 to 45%, preferably from 10 to 40%, particularly preferably from 15 to 35%, and the volume fraction of the large particles is from 95 to 55%, preferably from 90 to 60%, particularly preferably from 85 to 65%.

Small particles in the context of this invention are those having a particle diameter of from 0.05 to 0.7 µm, preferably from 0.1 to 0.5 µm, particularly preferably from 0.2 to 0.4 µm.

Large particles in the context of this invention are those having a particle diameter of from 0.4 to 5.0 µm, preferably from 0.5 to 4.0 µm, particularly preferably from 0.5 to 3.0 µm.

The particle sizes and their distribution can be measured by means of dynamic light scattering and Frauenhofer diffraction. The ratio, stated in % by volume, of small to large particles is taken from the cumulative undersize plot.

The determination of the particle size distributions was carried out using a laser particle analyzer from Coulter under the following conditions:

Apparatus: Laser Particle Analyzer LS 230 (Coulter) Measuring range: from 0.04 µm to 2 000 µm
Measuring principle: Fraunhofer diffraction in combination with PIDS
(Polarization Intensity Differential Scattering)
Laser wavelength: 750 nm
PIDS light source: Tungsten halogen lamp, 3 filters: 450 nm, 600 nm, 900 nm, scattered light measurement at 6 angles: 60°, 75°, 90°, 105°, 120° and 146°, vertically and horizontally polarized
Dispersing unit: Small Volume Module (SVM module)
Optical model: PSL (Polystyrene latex) with PIDS, form factor 1
Measuring liquid: 2-Propanol
Liquid refractive index: 1.374
Real part of sample refractive index: 1.6
Imaginary part of sample refractive index: 0
Sample preparation: 0.5 ml of graft polyol is added to 15 ml of isopropanol (2-propanol) in a 30 ml beaker by means of a Pasteur pipette and stirred thoroughly. This dispersion is added dropwise to the SVM module of the measuring apparatus until sufficient density is automatically indicated. The measurement is then started.

The small particles according to the invention are characterized by a peak which preferably begins in a range of from 0.05 to 0.08 µm and ends in a range of from 0.4 to 0.7 µm. The maximum of the peak of the small particles is advantageously at from 0.2 to 0.40 µm.

The large particles according to the invention are characterized by a peak which preferably begins in a range of from 0.4 to 1.0 µl and ends in a range of from 1.2 to 5.0 µm. The maximum of the peak of the large particles is advantageously at from 0.7 to 2.5 µm.

According to the invention, the measured peaks of small and large particles are substantially separated from one another and do not overlap. Of course, particles of other sizes which are not in the defined ranges may also be present in small amounts (usually not more than 5% by volume) in the novel graft polyol without casting doubt on its bimodality and without adversely affecting the desired properties of the final polymer polyol and its processing in polyurethane systems.

The preparation of the novel graft polyols can be carried out in different ways.

Graft polyols are usually prepared by free radical polymerization of the monomers acrylonitrile, styrene and optionally further monomers, a macromer and a moderator and with the use of a free radical initiator, generally azo or peroxide compounds, in a polyetherol or polyesterol as the continuous phase.

Carrier polyols used are compounds having at least a hydroxyl group functionality of from 2 to 8, preferably from 2 to 6, and an average molecular weight of from 300 to 8 000, preferably from 300 to 5 000. The hydroxyl number of the polyhydroxy compounds is as a rule from 20 to 160, preferably from 28 to 70.

The polyetherpolyols used as carrier polyols are prepared by known processes, as described, for example, further below. The carrier polyols are used individually or in the form of mixtures.

Macromers, also referred to as stabilizers, are linear or branched polyols which have molecular weights of $\geq$2 000 g/mol and contain at least one terminal, reactive olefinic unsaturated group. The ethylenically unsaturated group can be introduced into an existing polyol by reaction with anhydrides (maleic anhydride, fumaric acid), acrylate and methacrylate derivatives and isocyanate derivatives, such as 3-isopropenyl-1,1-dimethylbenzyl isocyanates or isocyanatoethyl methacrylates. A further method is the preparation of a polyol by alkoxidation of propylene oxide and ethylene oxide using initiator molecules having hydroxyl groups and ethylenic unsaturation. Examples of such macromers are described in the U.S. Pat. No. 4,390,645, U.S. Pat. No. 5,364,906, EP 0 461 800, U.S. Pat. No. 4,997,857, U.S. Pat. No. 5,358,984, U.S. Pat. No. 5,990,232, Wo 01/04178 and U.S. Pat. No. 6,013,731.

During the free radical polymerization, the macromers are also incorporated into the copolymer chain. This results in the formation of block copolymers which have a polyether and a polyacrylonitrile/styrene block, act as a phase mediator in the interface of continuous phase and dispersed phase and suppress the agglomeration of the graft polyol particles. The amount of the macromers is usually from 1 to 15% by weight, based on the total weight of the monomers used for the preparation of the graft polyol.

For the preparation of graft polyols, moderators, also referred to as chain-transfer agents, are usually used. The use and the function of these moderators are described in the patents U.S. Pat. No. 4,689,354, EP 0 365 986, EP 0 510 533 and EP 0 640 633, EP 008 444 and EP 0731 118 B1. By chain transfer of the growing radical, the moderators reduce the molecular weight of the copolymers forming, with the result that the crosslinking between the polymer molecules is reduced, which influences the viscosity and the dispersion stability as well as the filterability of the graft polyols. The amount of moderators is usually from 0.5 to 25% by weight, based on the total weight of the monomers used for the preparation of the graft polyol. Moderators usually used for the preparation of graft polyols are alcohol, such as 1-butanol, 2-butanol, isopropanol, ethanol and methanol, cyclohexane, toluenes, mercaptans, such as ethanethiol, 1-heptanethiol, 2-octanethiol, 1-dodecanethiol, thiophenol, 2-ethylhexyl thioglycolate, methyl thioglycolate and cyclohexyl mercaptan, and enol ether compounds, morpholines and α-(benzoyloxy)styrene.

Peroxide or azo compounds, such as dibenzoyl peroxide, lauroyl peroxide, tert-amyl peroxy-2-ethylhexanoate, di-tertbutyl peroxide, diisopropyl peroxydicarbonate, tert-butyl peroxy-2-ethylhexanoate, tert-butyl perpivalate, tert-butyl perneodecanoate, tert-butyl perbenzoate, tert-butyl percrotonate, tert-butyl perisobutyrate, tert-butyl peroxy-1-methylpropanoate, tert-butyl peroxy-2-ethylpentanoate, tert-butyl peroxyoctanoate and di-tert-butyl perphthalate, 2,2'-azobis(2,4-dimethylvaleronitrile), 2,2'-azobisisobutyronitrile (AIBN), dimethyl 2,2'-azobisisobutyrate, 2,2'-azobis(2-methylbutyronitrile) (AMBN) and 1,1'-azobis(1-cyclohexanecarbonitrile), are usually used for initiating the free radical polymerization. The amount of the initiators is usually from 0.1 to 6% by weight, based on the total weight of the monomers used for the preparation of the graft polyol.

Owing to the reaction rate of the monomers and the half-life of the initiators, the free radical polymerization for the preparation of graft polyols is usually carried out at from 70 to 150° C. and up to 20 bar. Preferred reaction conditions for the preparation of graft polyols are temperatures of from 80 to 140° C. at a pressure of from atmospheric pressure to 15 bar.

Graft polyols are prepared in continuous processes using stirred kettles having a continuous feed and discharge, stirred kettle cascades, tubular reactors and loop reactors having continuous feed and discharge, or in batchwise processes by means of a batch reactor and a semibatch reactor.

In the semibatch process, only a part of the raw materials, the initially taken reaction mixture, is initially taken in the reactor. The remaining raw materials are transferred to the reactor in one or more metered streams during the reaction. For safety reasons, the initiator and the monomers should not be present in one metered stream. By means of the semibatch procedure, the course of the reaction, such as the removal of the heat of reaction and the particle formation, can be better controlled. In the preparation of graft polyols in the semibatch process, the remaining raw materials are usually metered into the reactor in the course of from 60 to 300 minutes, followed by a postreaction time of from 5 to 45 minutes.

After the synthesis, the crude graft polyols also pass through various working-up steps in which the properties of the commercial products are established. Thus, the monomers not completely converted during the free radical polymerization and further byproducts, such as odorous substances, volatile organic compounds (VOC) and compounds which cause fogging, are removed, usually by stripping under reduced pressure. Graft polyols may not contain any oversize particles and impurities, in order to avoid faults during processing (e.g. blockage of filters, sieves, nozzles). Graft polyols are therefore generally purified by a one-stage or multi-stage filtration prior to sale.

Graft polyols having a substantially separated, bimodal particle size distribution can be prepared by mixing graft polyols having a narrow, monomodal particle size distribution and different particle sizes (cf. FIG. 4).

The novel graft polyols are obtained if at least one graft polyol having a monomodal particle size distribution with small particles which have a diameter of from 0.05 to 0.7 µm, preferably from 0.1 to 0.5 µm, particularly preferably from 0.2 to 0.4 µm, and at least one graft polyol having a monomodal particle size distribution with large particles which have a diameter of from 0.4 to 5.0 µm, preferably from 0.5 to 4.0 µm, particularly preferably from 0.7 to 3.0 µm, are mixed with one another. All batchwise and continuous mixing methods corresponding to the prior art may be used.

The monomodal graft polyols should be mixed with one another in a ratio such that the total solids content of the resulting graft polyol having a bimodal particle size distribution consists of a volume fraction of from 5 to 45%, preferably from 10 to 40%, particularly preferably from 15 to 35%, of small particles and a volume fraction of from 95 to 55%, preferably from 90 to 60%, particularly preferably from 85 to 65%, of large particles, the volume fractions summing to 100%. As described further above, here too small amounts (preferably less than 5% by volume) of particles of other sizes which are not in the defined ranges may be present in the starting graft polyols and in the novel graft polyol without adversely affecting the result.

The peaks of the large and small particles of the resulting graft polyol which are measured by the light scattering method may not overlap, as mentioned above in the description of the novel graft polyols.

The graft polyols to be mixed according to the invention may contain the same carrier polyols but may also differ in their carrier polyols (OH number, ethylene oxide/propylene oxide ratio, chemical structure, functionality, content of primary OH groups). By mixing graft polyols with different carrier polyols, the foaming behavior and the foam properties can be established in a specific manner.

The ratio of the monomers acrylonitrile to styrene in the solids of the graft polyols to be mixed may be the same but is preferably from 1:1 to 1:3; however, it may also differ.

The solids content of the graft polyol resulting from the mixing process is from 5 to 65% by weight, it being possible for this solids content to comprise equal amounts or different amounts of the graft polyols to be mixed. The solids content of graft polyols is calculated from the percentage ratio of the monomers used, preferably styrene, acrylonitrile and the macromers, to the carrier polyols used and is usually determined gravimetrically for the final graft polyol from the percentage ratio of the solid mass to total mass of the graft polyol.

Graft polyols of the prior art, selected according to the respective desired particle sizes and solids contents, can be used for this novel process. The monomodal graft polyols are prepared by conventional processes.

Graft polyols having small particles and monomodal particle size distribution can be prepared, for example, by semibatch reactions, as described in a series of patents, such as U.S. Pat. No. 4,522,976, EP 0163188, U.S. Pat. No. 4,568,705, DE 3575734, EP 00910336 and EP 221412. The mean particle size can be established by means of the amount of the initially taken macromer. Such graft polyols usually have particle sizes of from 0.05 to 0.7 µm.

Graft polyols having large particles and a narrow, monomodal particle size distribution can be prepared by various processes.

Graft polyols having a narrow, monomodal particle size distribution and large particles can be prepared by the semibatch process if, in contrast to the procedure described above for graft polyols having small particles, substantially less macromer is initially taken in the initially taken reaction mixture, a mixture of carrier polyol and macromer and further reaction components, for example moderators. As a result, fewer particles which grow to large particles in the further course of the reaction are nucleated.

Furthermore, graft polyols having a narrow, monomodal particle size distribution and large particles can be prepared in a semibatch process by using an initially taken reaction mixture comprising carrier polyol, macromer and a graft polyol having small particles and a narrow, monomodal particle size distribution, as described further above, these particles growing to their final size in the course of the semibatch reaction. The graft polyol used in the initially taken reaction mixture and having small particles and a narrow, monomodal particle size distribution advantageously has a solids content of from 20 to 60% by weight. The solids content of this graft polyol contributes more than 3.0% by weight of the solids content of the resulting graft polyol having large particles and a narrow, monomodal particle size distribution. The weight of the macromer used in the initially taken reaction mixture is preferably from 1.0 to 10.0, particularly preferably from 3.0 to 8.0, % by weight, based on the total weight of the ethylenically unsaturated monomers used, and is only so large that no further small particles having a narrow monomodal particle size distribution are formed in the further course of the reaction.

A further process for the preparation of the novel graft polyols having a substantially separated bimodal particle size distribution is a semibatch process wherein the initially taken reaction mixture contains in each case at least one carrier polyol, one macromer and one graft polyol having a monomodal particle size distribution, more than 3, preferably more than 3.3, particularly preferably more than 3.5, % by weight of the solids content in the resulting graft polyol consisting of the solids content of the graft polyol used in the initially taken reaction mixture and having a monomodal particle size distribution. Particularly good results are obtained if the solids content of the resulting graft polyol consists of more than 6.8% by weight of the solids content of the graft polyol in the initially taken reaction mixture. The upper limit of the solids content resulting from the graft polyol used in the initially taken reaction mixture is preferably 20% by weight.

The weight of the macromer used in the initially taken reaction mixture is from 1 to 30, advantageously at least 2, but preferably from 3 to 15, % by weight, based on the total weight of the ethylenically unsaturated monomers used; however, it is so large that small particles are nucleated in the further course of the reaction.

The required amount of macromer is directly dependent on the mean particle size of the graft polyol used in the initially taken reaction mixture and on the molecular weight of the macromer used.

Since the macromer first saturates the surface of the particles used in the initially taken reaction mixture and only thereafter does excess macromer nucleate further particles, the amount of macromer to be used increases with increasing solids content and/or with decreasing particle diameter at a given solids content of the graft polyol in the initially taken reaction mixture (and hence increasing total particle surface area).

At a constant mean particle diameter of the graft polyol used in the initially taken reaction mixture, the ratio of large to small particles in the resulting graft polyol is determined by the ratio of the mass of the macromer used in the initially taken reaction mixture to the mass of the solid in the initially taken graft polyol.

Advantageously used macromers are polyols which have an average molecular weight of more than 2 000 g/mol and a hydroxyl group functionality of $\geq 2$ and possess at least one terminal, polymerizable, ethylenically unsaturated group. However, macromers having an average molecular weight of more than 3 000 g/mol are preferred, those having an average molecular weight of more than 5 000 g/mol being particularly preferred.

The novel graft polyols having a substantially pronounced bimodal particle size distribution have a viscosity (at 25° C.) which is advantageously at least 5%, preferably at least 10%, particularly preferably from 12 to 20%, lower compared with a graft polyol having a monomodal particle size distribution and exclusively small or large particles, assuming that the graft polyols to be compared do not differ in solids content and in the starting materials. In particular cases, a reduction of viscosity of up to 45% is achieved.

The novel graft polyols have better flow behavior under high shear load. Consequently, the filtration rate during purification of the graft polyols after production increases or a smaller filter area is required for the same throughputs.

Owing to the improved cell opening behavior with the use of these graft polyols, the use of cell opening polyols and other process assistants can be limited in cold-curing foam formulations, which makes the formulation cheaper, eliminates a possible source of metering errors and improves the foam properties. Improved elongations at break and tear propagation resistances are achieved in the case of molded foams and better values for the tensile strength and elongation as well as compression set are achieved in the case of conventional slabstock foams having a high load-bearing capacity.

Furthermore, they have a long shelf life and very good processing properties during further processing to give polyurethane end products.

The novel graft polyols are very suitable for use as a polyol component in the preparation of polyurethanes, in particular for the preparation of molded flexible foams and HLB (High Load Bearing, conventional flexible foams having a higher load-bearing capacity) and HR (High Resilience, highly resilient flexible foam) flexible slabstock foams.

The novel polyurethanes prepared by reacting organic and/or modified organic polyisocyanates (a) with the novel graft polyols (b) described above and, if required, further compounds (c) having hydrogen atoms reactive toward isocyanates, in the presence of catalysts (d), if required water and/or other blowing agents (e) and, if required, further assistants and additives (f).

Regarding the further starting components which may be used in addition to the novel graft polyols having a bimodal particle size distribution, the following may be stated specifically:

Suitable organic polyisocyanates (a) for the preparation of the novel polyurethanes are the aliphatic, cycloaliphatic, araliphatic and preferably aromatic polyfunctional isocyanates known per se.

Specific examples are alkylene diisocyanates having 4 to 12 carbon atoms in the alkylene radical, such as dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixtures of these isomers, 1-isocyanato-3,3,5-trimethyl-5-isocyanatomethylcyclohexane (IPDI), hexahydrotolylene 2,4- and 2,6-diisocyanate and the corresponding isomer mixtures, dicyclohexylmethane 4,4'-, 2,2'- and 2,4'-diisocyanate and the corresponding isomer mixtures, and preferably aromatic di- and polyisocyanates, e.g. tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates. The organic di- and polyisocyanates can be used individually or in the form of their mixtures.

Tolylene diisocyanate, mixtures of diphenylmethane diisocyanate isomers, mixtures of diphenylmethane diisocyanate and crude MDI or tolylene diisocyanate with diphenylmethane diisocyanate and/or crude MDI are preferably used. Mixtures of diphenylmethane diisocyanate isomers with at least 30% by weight of diphenylmethane 2,4'-diisocyanate are particularly preferably used.

Frequently, modified polyfunctional isocyanates, i.e. products which are obtained by chemical reaction of organic di- and/or polyisocyanates, are also used. Examples are di- and/or polyisocyanates containing ester, urea, biuret, allophanate, carbodiimide, isocyanurate, uretdione and/or urethane groups. Specific suitable examples are organic, preferably aromatic, polyisocyanates containing urethane groups and having NCO contents of from 43 to 15, preferably from 31 to 21, % by weight, based on the total weight, diphenylmethane 4,4'-diisocyanate modified by reaction, for example with low molecular weight diols, triols, dialkylene glycols, trialkylene glycols or polyoxyalkylene glycols having molecular weights of up to 6 000, in particular up to 1 500, modified diphenylmethane 4,4'- and 2,4'-diisocyanate mixtures or modified crude MDI or tolylene 2,4- or 2,6-diisocyanate. The di- and polyoxyalkylene glycols may be used individually or as mixtures, examples being diethylene glycol, dipropylene glycol, polyoxyethylene, polyoxypropylene and polyoxypropylene-polyoxyethylene glycols or the corresponding triols and/or tetrols. Also suitable are NCO-containing prepolymers having NCO contents of from 25 to 3.5, preferably from 21 to 14, % by weight, based on the total weight, prepared from the polyesterpolyols and/or preferably polyetherpolyols described below and diphenylmethane 4,4'-diisocyanate, mixtures of diphenylmethane 2,4'- and 4,4'-diisocyanate, tolylene 2,4- and/or 2,6-diisocyanates or crude MDI. Liquid polyisocyanates containing carbodiimide groups and/or isocyanurate rings and having NCO contents of from 43 to 15, preferably from 31 to 21, % by weight, based on the total weight, for example based on diphenylmethane 4,4'-, 2,4'- and/or 2,2'-diiscoyanate and/or tolylene 2,4- and/or 2,6-diisocyanate, have furthermore proven useful.

The modified polyisocyanates can be mixed with one another or with unmodified organic polyisocyanates, e.g. diphenylmethane 2,4'- or 4,4'-diisocyanate, crude MDI or tolylene 2,4- and/or 2,6-diisocyanate.

NCO-containing prepolymers which are advantageously formed from the reaction of the isocyanates (a) with polyols of the components (b) and/or (c) and, if required, compounds of the components (c) and/or (d) have proven particularly useful as modified organic polyisocyanates.

In addition to the graft polyols (b) described above and used according to the invention, if required further compounds (c) having hydrogen atoms reactive toward isocyanates are added.

Compounds having at least two reactive hydrogen atoms are primarily suitable for this purpose. Those having a functionality of from 2 to 8, preferably from 2 to 3, and an average molecular weight of from 300 to 8 000, preferably from 300 to 5 000, are expediently used. The hydroxyl number of the polyhydroxy compounds is as a rule from 20 to 160, preferably from 28 to 70.

The polyetherpolyols used in the component (c) are prepared by known processes, for example by anionic polymerization with alkali metal hydroxides, e.g. sodium hydroxide or potassium hydroxide, or alkali metal alcoholates, e.g. sodium methylate, sodium ethylate, potassium ethylate or potassium isopropylate, as catalyst and with the addition of at least one initiator which contains from 2 to 8, preferably 2 or 3, reactive hydrogen atoms per molecule, or by cationic polymerization with Lewis acids, such as antimony pentachloride, boron fluoride etherate, etc., or bleaching earth as catalysts or by double metal cyanide catalysis from one or more alkylene oxides having 2 to 4 carbon atoms in the alkylene radical. For special intended uses, monofunctional initiators may also be incorporated into the polyether structure.

Suitable alkylene oxides are, for example, tetrahydrofuran, 1,3-propylene oxide, 1,2- and 2,3-butylene oxide, styrene oxide and preferably ethylene oxide and 1,2-propylene oxide. The alkylene oxides may be used individually, alternately in succession or as mixtures.

Examples of suitable initiator molecules are water, organic dicarboxylic acids, such as succinic acid, adipic acid, phthalic acid and terephthalic acid, aliphatic and aromatic, unsubstituted and N-monoalkyl-substituted and N,N- and N,N'-dialkyl-substituted diamines having 1 to 4 carbon atoms in the alkyl radical, such as unsubstituted and monoalkyl- and dialkyl-substituted ethylenediamine, diethylenetriamine, triethylenetetramine, 1,3-propylene-diamine, 1,3- and 1,4-butylenediamine, 1,2-, 1,3-, 1,4-, 1,5- and 1,6-hexamethylenediamine, phenylenediamine, 2,3-, 2,4- and 2,6-toluenediamine and 4,4', 2,4'- and 2,2'-diaminodiphenylmethane. Other suitable initiator molecules are alkanolamines, e.g. ethanolamine, N-methyl- and N-ethylethanolamine, dialkanolamines, e.g. diethanolamine, N-methyl- and N-ethyldiethanolamine, and trialkanolamines, e.g. triethanolamine, and ammonia. Polyhydric, in particular dihydric and/or trihydric, alcohols, such as ethanediol, 1,2- and 2,3-propanediol, diethylene glycol, dipropylene glycol, 1,4-butanediol, 1,6-hexanediol, glycerol, trimethylolpropane and pentaerythritol, are preferably used.

The polyetherpolyols, preferably polyoxypropylene polyols and polyoxypropylenepolyoxyethylene polyols, have a functionality of, preferably, from 2 to 8, in particular from 2 to 3, and molecular weights of from 300 to 8 000, preferably from 300 to 6 000, in particular from 1 000 to 5 000, and suitable polyoxytetramethylene glycols have a molecular weight of up to about 3 500.

The polyetherpolyols may be used individually or in the form of mixtures.

In addition to the polyetherpolyols described, for example, polyetherpolyamines and/or further polyols selected from the group consisting of the polyesterpolyols, polythioetherpolyols, polyesteramides, hydroxyl-containing polyacetals and hydroxyl-containing aliphatic polycarbonates or mixtures of at least two of said polyols may also be used. The hydroxyl number of the polyhydroxy compounds is as a rule from 20 to 80, preferably from 28 to 70.

Suitable polyesterpolyols can be prepared, for example, from organic dicarboxylic acids of 2 to 12 carbon atoms, preferably aliphatic dicarboxylic acids of 4 to 6 carbon atoms, polyhydric alcohols, preferably diols, of 2 to 12, preferably 2 to 6, carbon atoms, by conventional processes. Usually, the organic polycarboxylic acids and/or derivatives thereof and polyhydric alcohols, advantageously in a molar ratio of from 1:1 to 1:1.8, preferably from 1:1.05 to 1:1.2, are subjected to polycondensation in the absence of a catalyst or preferably in the presence of esterification catalysts, expediently in an atmosphere comprising inert gas, e.g. nitrogen, carbon monoxide, helium, argon, etc., in the melt at from 150 to 250° C., preferably from 180 to 220° C., under atmospheric or reduced pressure, to the desired acid number, which is advantageously less than 10, preferably less than 2.

Examples of suitable hydroxyl-containing polyacetals are the compounds which can be prepared from glycols, such as diethylene glycol, triethylene glycol, 4,4,-dihydroxyethoxydiphenyldimethylmethane, hexanediol and formaldehyde. Suitable polyacetals can also be prepared by polymerization of cyclic acetals. Suitable hydroxyl-containing polycarbonates are those of the type known per se, which can be prepared, for example, by reacting diols, such as 1,3-propanediol, 1,4-butanediol and/or 1,6-hexanediol, diethylene glycol, triethylene glycol or tetraethylene glycol, with diaryl carbonates, e.g. diphenyl carbonate, or phosgene. The polyesteramides include, for example, the predominantly linear condensates obtained from polybasic, saturated and/or unsaturated carboxylic acids or anhydrides thereof and polyhydric saturated and/or unsaturated amino alcohols or mixtures of polyhydric alcohols and amino alcohols and/or polyamines. Suitable polyetherpolyamines can be prepared from the abovementioned polyetherpolyols by known processes. The cyanoalkylation of polyoxyalkylenepolyols and subsequent hydrogenation of the resulting nitrile (U.S. Pat. No. 3,267,050) or the partial or complete amination of polyoxyalkylene polyols with amines or ammonia in the presence of hydrogen and catalysts (DE-A-1215373) may be mentioned by way of example.

The compounds of component (c) can be used individually or in the form of mixtures.

The polyurethanes can be prepared with or without the use of chain extenders and/or crosslinking agents. Chain extenders and/or crosslinking agents used are diols and/or triols having molecular weights of less than 400, preferably from 60 to 300. For example, aliphatic, cycloaliphatic and/or araliphatic diols of 2 to 14, preferably 4 to 10, carbon atoms, e.g. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis (2-hydroxyethyl)hydroquinone, triols, such as 1,2,4- and 1,3, 5-trihydroxycyclohexane, triethanolamine, diethanolamine, glycerol and trimethylolpropane, and low molecular weight hydroxyl-containing polyalkylene oxides based on ethylene oxide and/or 1,2-propylene oxide and the abovementioned diols and/or triols are suitable as initiator molecules.

If chain extenders, crosslinking agents or mixtures thereof are used for the preparation of the polyurethanes, they are expediently employed in an amount of up to 10% by weight, based on the weight of the polyol compounds.

The chlorofluorocarbons (CFC) generally known from polyurethane chemistry and highly fluorinated and/or perfluorinated hydrocarbons can be used as blowing agents (e). However, the use of these substances is greatly restricted or has been completely discontinued for ecological reasons. In addition to chlorofluorohydrocarbons (CFHC) and fluorohydrocarbons (FHC), in particular aliphatic and/or cycloaliphatic hydrocarbons, in particular pentane and cyclopentane, or acetals, e.g. methylal, and $CO_2$, are possible alternative blowing agents. These physical blowing agents are usually added to the polyol component of the system. However, they can also be added in the isocyanate component or in a combination of both the polyol component and the isocyanate component. They may also be used together with highly fluorinated and/or perfluorinated hydrocarbons, in the form of an emulsion of the polyol component. Emulsifiers, if they are used, are usually oligomeric acrylates which contain polyoxyalkylene and fluoroalkane radicals bonded as side groups and have a fluorine content of from about 5 to 30% by weight. Such products are sufficiently well known from plastics chemistry, for example EP-A-0351614. The amount of blowing agent or blowing agent mixture used is from 1 to 25, preferably from 1 to 15, % by weight, based in each case on the total weight of the components (b) to (d).

It is furthermore possible and customary to add water in an amount of from 0.5 to 15, preferably from 1 to 5, % by weight, based on the total weight of the components (b) to (f), as a blowing agent to the polyol component. The addition of water can be effected in combination with the use of the other blowing agents described.

In the context of the present invention, water is preferably used as the blowing agent.

Catalysts (d) used for the preparation of the polyurethanes are in particular compounds which greatly accelerate the reaction of the reactive hydrogen atoms, in particular of hydroxyl-containing compounds of the components (b), (c) and (d), with the organic, unmodified or modified polyisocyanates (a). Organic metal compounds, preferably organic tin compounds, such as tin(II) salts of organic carboxylic acids, e.g. tin(II) acetate, tin(II) octanoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate, are suitable. The organic metal compounds are used alone or, preferably, in combination with strongly basic amines. Examples are amidines, such as 2,3-dimethyl-3,4,5,6-tetrahydropyrimidine, tertiary amines, such as triethylamine, tributylamine, dimethylbenzylamine, N-methyl-, N-ethyl- and N-cyclohexylmorpholine, N,N,N',N'-tetramethylethylenediamine, N,N,N',N'-tetramethylbutanediamine, N,N,N',N'-tetramethyl-1,6-hexanediamine, pentamethyldiethylenetriamine, tetramethyldiamino-ethyl ether, bis(dimethylaminopropyl) urea, dimethylpiperazine, 1,2-dimethylimidazole, 1-azabicyclo[3.3.0]octane and preferably 1,4-diazabicyclo[2.2.2]octane, and aminoalkanol compounds, such as triethanolamine, triisopropanolamine, N-methyl- and N-ethyldiethanolamine and dimethylethanolamine.

Other suitable catalysts are tris(dialkylaminoalkyl)-s-hexahydrotriazines, in particular tris(N,N-dimethylaminopropyl)-s-hexahydrotriazine, tetraalkylammonium hydroxides, such as tetramethylammonium hydroxide, alkali metal hydroxide, such as sodium hydroxide, and alkali metal alcoholates, such as sodium methylate and potassium isopropylate, and alkali metal salts of long-chain fatty acids having 10 to 20 carbon atoms and, if required, OH side groups. From 0.001 to 5, in particular from 0.05 to 2, % by weight, based on the weight of the components (b) to (f), of catalyst or catalyst combination are preferably used.

If required, further assistants and/or additives (f) are incorporated into the reaction mixture for the preparation of the novel polyurethanes. Examples are flameproofing agents, stabilizers, fillers, dyes, pigments and hydrolysis stabilizers and fungistatic and bacteriostatic substances.

Suitable flameproofing agents are, for example, tricresyl phosphate, tris(2-chloroethyl) phosphate, tris(2-chloropropyl) phosphate, tetrakis(2-chloroethyl) ethylene diphosphate, dimethyl methanephosphonate, diethyl diethanolaminomethylphosphonate and commercial halogen-containing and halogen-free flameproofing agents. In addition to the abovementioned halogen-substituted phosphates, inorganic or organic flameproofing agents, such as red phosphorus, hydrated alumina, antimony trioxide, arsenic oxide, ammonium polyphosphate and calcium sulfate, expanded graphite or cyanuric acid derivatives such as melamine, or mixtures of at least two flameproofing agents, e.g. ammonium polyphosphates and melamine and, if required, cornstarch or ammonium polyphosphate, melamine and expanded graphite and/ or, if required, aromatic polyesters, can also be used for flameproofing the polyisocyanate polyadducts. Additions of melamine prove particularly effective. In general, it has proven expedient to use from 5 to 50, preferably from 5 to 30, parts by weight of said flameproofing agents per 100 parts by weight of the components (b) to (f).

Stabilizers used are in particular surface-active substances, i.e. compounds which serve for supporting the homogenization of the starting materials and may also be suitable for regulating the cell structure of the plastics. Examples are emulsifiers, such as the sodium salts of castor oil sulfates or fatty acids and salts of fatty acids with amines, e.g. of oleic acid with diethylamine, of stearic acid with diethanolamine and of ricinoleic acid with diethanolamine, salts of sulfonic acids, for example alkali metal or ammonium salts of dodecylbenzene- or dinaphthylmethanedisulfonic acid and ricinoleic acid; foam stabilizers, such as siloxane/oxyalkylene copolymers and other organopolysiloxanes, oxyethylated alkylphenols, oxyethylated fatty alcohols, liquid paraffins, castor oil esters or ricinoleic esters, Turkey red oil and peanut oil, and cell regulators, such as paraffins, fatty alcohols and dimethylpolysiloxanes. The predominantly used stabilizers are organopolysiloxanes which are water-soluble. These are polydimethylsiloxane radicals onto which a polyether chain comprising ethylene oxide and propylene oxide has been grafted. The surface-active substances are usually used in amounts of from 0.01 to 5 parts by weight, based on 100 parts by weight of the components (b) to (f).

Fillers, in particular reinforcing fillers, are to be understood as meaning the conventional organic and inorganic fillers, reinforcing agents, weighting agents, agents for improving the abrasion behavior in surface coatings, coating materials, etc., which are known per se. Specific examples are inorganic fillers, such as silicate minerals, for example sheet silicates, such as antigorite, serpentine, hornblendes, amphiboles, chrysotile and talc, metal oxides, such as kaolin, aluminas, titanium oxides and iron oxides, metal salts, such as chalk, barite and inorganic pigments, such as cadmium sulfide and zinc sulfide, and glass, etc. Kaolin (china clay), aluminum silicate and coprecipitates of barium sulfate and aluminum silicate, and natural and synthetic fibrous minerals, such as wollastonite, metal fibers and in particular glass fibers of different lengths, which, if required, may have been sized, are preferably used. Examples of suitable organic fillers are carbon, rosin, cyclopentadienyl resins and graft polymers and cellulose fibers, polyamide, polyacrylonitrile, polyurethane and polyester fibers based on aromatic and/or aliphatic dicarboxylic esters and in particular carbon fibers. The inorganic and organic fillers can be used individually or as mixtures and are advantageously incorporated into the reaction mixture in amounts of from 0.5 to 50, preferably from 1 to 40, % by weight, based on the weight of the components (a) to (f), although the content of mats, nonwovens and woven fabrics of natural and synthetic fibers can reach values of up to 80.

Further information on the abovementioned other conventional assistants and additives is to be found in the technical literature, for example the monograph by J. H. Saunders and K. C. Frisch, High Polymers, Volume XVI, Polyurethanes, Parts 1 and 2, Interscience Publishers 1962 and 1964, or in the above-cited Kunststoffhandbuch, Polyurethane, Volume VII, Hanser-Verlag, Munich, Vienna, 1st to 3rd editions.

For the preparation of the novel polyurethanes, the organic and/or modified organic polyisocyanates (a), the graft polyol (b) and, if required, the further compounds (c) having hydrogen atoms reactive toward isocyanates and further components (d) to (f) are reacted in amounts such that the ratio of the number of equivalents of NCO groups of the polyisocyanates (a) to the sum of the reactive hydrogen atoms of the components (b) to (f) is less than 0.95:1, preferably less than 0.70:1.

In the novel process, polyurethane foams are advantageously prepared by the one-shot method, for example with the aid of the high-pressure or low-pressure technique, in open or closed molds, for example metallic molds. The continuous application of the reaction mixture to suitable belts or the batchwise introduction into open block molds for the production of slabstock foams is also customary.

It has proven particularly advantageous, especially in the case of molded foams, to employ the two-component method and to combine the components (b) to (f) to give a polyol component, often also referred to as component A, and to use the organic and/or modified organic polyisocyanates (a), particularly preferably an NCO prepolymer or mixtures of this prepolymer and further polyisocyanates, and, if required, blowing agents (e) as the isocyanate component, often also referred to as component B. Slabstock foams are usually prepared by the multicomponent method (individual metering of the raw materials and additives or a plurality of different premixes). In slabstock foam production, the reaction products are combined in a mixing head and added directly or via a trough to the open foaming belt. The temperatures are preferably from 20 to 25° C.

The starting components are mixed at from 15 to 90° C., preferably from 20 to 60° C., in particular from 20 to 35° C., and introduced into the open mold or, under atmospheric or superatmospheric pressure, into the closed mold or, in the case of a continuous workstation, applied to a belt which receives the reaction material. The mixing can be carried out mechanically by means of a stirrer, by means of a spiral stirrer or by high-pressure mixing in a nozzle. The mold temperature is expediently from 20 to 110° C., preferably from 30 to 60° C., in particular from 35 to 55° C.

The polyurethane foams prepared by the novel process advantageously have a density of from 10 to 150, preferably from 40 to 60, $kg/m^3$ in the case of foam molding and preferably from 14 to 100, in particular from 20 to 80, $kg/m^3$ in the case of slabstock foam production. The compressive strengths are then from 1 to 20, preferably from 1.5 to 12, kPa.

The examples which follow illustrate the present invention without restricting it.

EXAMPLES

Raw Materials

For the preparation of the graft polyols and of the graft polyol mixtures, the following raw materials were used:

Polyol 1: polyether alcohol based on glycerol, monoethylene glycol, propylene oxide and ethylene oxide, hydroxyl number: 48 mg KOH/g, viscosity at 25° C.: 540 mPa·s, suitable for conventional slabstock foam Polyol 2: polyether alcohol based on glycerol, propylene oxide and ethylene oxide, hydroxyl number: 35 mg KOH/g, viscosity at 25° C.: 850 mPa·s, suitable for high resilience (HR) slabstock foam and molded foam Polyol 3: polyether alcohol based on glycerol, propylene oxide and ethylene oxide; EO content 73% by weight, hydroxyl number: 42 mg KOH/g, viscosity at 25° C.: 950 mPa·s, cell opener polyol Initiator 1: Wako® V-601, dimethyl 2,2'-azobisisobutylate, Wako Chemicals GmbH Initiator 2: Vazo® 67, 2,2'-azobis(2-methylbutyronitrile), Du Pont de Nemours GmbH Initiator 3: Trigonox® 121, tert-amyl peroxy-2-ethylhexanoate, Akzo Nobel Chemicals Macromer 1: monofumarate ester, in which the second acid group has been reacted with propylene oxide, of a polyether alcohol based on trimethylenepropane and propylene oxide; hydroxyl number: 19 mg KOH/g Macromer 2: monofumarate ester, in which the second acid group has been reacted with propylene oxide, of a polyether alcohol based on glycerol, propylene oxide, ethylene oxide; hydroxyl number: 22 mg KOH/g Macromer 3: 3-isopropenyl-α,α-dimethylbenzyl isocyanate (TMI) adduct of a polyether alcohol based on sorbitol, propylene oxide and ethylene oxide, hydroxyl number: 16 mg KOH/g Styrene: styrene, stabilized with 4-tert-butylpyrocatechol (TBC), BASF AG Acrylonitril: acrylonitril, stabilized with monomethyl ether hydroquinon (MEHQ), BASF AG Synthesis of the Fumarate Macromer (Macromers 1 and 2)

Calcium naphthenate (0.5% by weight, based on base polyol) and maleic anhydride (0.8 mol per mole of base polyol) were added to the base polyol having a water content of <0.02% by weight. The reaction mixture was heated to 125° C. under a nitrogen atmosphere and with stirring. During the subsequent two-hour reaction time, the monoester of maleic acid with the base polyol formed. After the reaction mixture had been heated to 143° C., an excess of propylene oxide (4.4-fold, based on the molar amount of maleic anhydride) was added and the reaction mixture was allowed to react for a further 8 hours. At the end of the reaction period, the excess of propylene oxide was removed under reduced pressure and the product was cooled to 25° C. and stabilized with antioxidants.

Synthesis of the TMI Macromer (Macromer 3)

Dibutyltin dilaurate as an esterification catalyst and 3-isopropenyl-α,α-dimethylbenzyl isocyanate (TMI) (0.8 mol per mole of base polyol) were added to the base polyol having a water content of <0.02% by weight at 80° C. with stirring. The mixture was stirred for a further hour at 80° C. Thereafter, phosphoric acid was added for deactivating the catalyst and the product was cooled to 25° C. and stabilized with antioxidants.

Determination of the Viscosity

The viscosity of the polyols was determined at 25° C. by means of a Rheotec RC 20 rotational viscometer using the spindle CC 25 DIN (spindle diameter: 12.5 mm, internal diameter of measuring cylinder: 13.56 mm) at a shear rate of 50 l/s.

Determination of the Solids Content

The solids content of the graft polyols and graft polyol mixtures was determined gravimetrically. For this purpose, about 2 g of graft polyol were finely dispersed with about 80 g of isopropanol in a centrifuge tube. The solid was then separated off in a Sorvall RC 26 Plus high speed centrifuge at 20 000 rpm (44 670 g). After the liquid phase present above the solid had been decanted, the solid was redispersed twice more in isopropanol, followed by centrifuging and separating off the liquid phase. After the solid had been dried at 80° C. and <1 mbar for at least two hours in a vacuum drying oven, the percentage solids content was calculated from the mass of the solid separated off and the mass of the graft polyol used.

Example 1

Synthesis of Graft Polyol having a Broad Particle Size Distribution

For the preparation of graft polyol 1 (GP 1) by the continuous process under pressure, a 300 ml stirred reactor with continuous inflow and discharge was used. The reactor was completely filled with polyol 2 or graft polyol from the preceding synthesis before the start of the reaction and was heated to a synthesis temperature of 133° C. with thorough stirring. The reaction mixture was provided in two metering containers and was pumped at the stated metering rates into the reactor by means of a static in-line mixer via an orifice in the bottom of the reactor.

| Metering stream 1 | metering rate: 14.54 g/min |
|---|---|
| Acrylonitrile | 449.96 g |
| Styrene | 900.05 g |
| Isopropanol | 202.50 g |

| Metering stream 2 | metering rate: 15.46 g/min |
|---|---|
| Polyol 2 | 1 578.45 g |
| Macromer 2 | 60.75 g |
| Initiator 2 | 10.80 g |

At the same time, the crude graft polyol was removed at the top of the reactor via a controllable, spring-loaded pressure control valve. In the initial phase, the product obtained was discarded. The steady state is usually achieved after 10 turnovers of the reactor content, which corresponded to about 3 000 ml. The crude graft polyol leaving the reactor was collected in a glass flask and then freed at 135° C. under reduced pressure (<0.1 mbar) from the unconverted monomers and other volatile compounds. The end product was finally stabilized with antioxidants. GP 1 had a viscosity of 13 000 mPa·s at a solids content of 45.0% by weight and had a broad particle size distribution corresponding to FIG. 1.

Example 2

Synthesis of Graft Polyols Having a Monomodal Particle Size Distribution (Table 1)

The preparation of the graft polyols having a monomodal particle size distribution by the semibatch process was effected in a 2 liter autoclave equipped with a 2-speed stirrer, internal cooling coils and electric heating jacket. Before the beginning of the reaction, the reactor was filled with a mixture of carrier polyol and macromer, flushed with nitrogen and heated to the synthesis temperature of 125° C. In some syntheses, a graft polyol was added as seed, in addition to the carrier polyol and the macromer, to the initially taken reaction mixture. In a further group of experiments, only a part of the macromer was initially taken in the reactor. The remaining amount was transferred to the reactor during the synthesis via an independent metering stream. The beginning and end of the macromer metering are shown in table 1.

The remaining part of the reaction mixture, consisting of further carrier polyol, initiator, the monomers and the reaction moderator, was initially taken in two metering containers. The synthesis of the graft polyols was effected by transferring the raw materials from the metering containers at constant metering rate by means of a static in-line mixer into the reactor. The duration of metering for the monomer/moderator mixture was 150 minutes, while the polyol/initiator mixture was metered into the reactor over 165 minutes. After a subsequent reaction time of a further 10 to 30 minutes at reaction temperature, the crude graft polyol was transferred into a glass flask via the bottom discharge valve. The product was then freed from the unconverted monomers and other volatile compounds at 135° C. under reduced pressure (<0.1 mbar). The end product was finally stabilized with antioxidants.

Example 3

Preparation of Graft Polyols having a Bimodal Particle Size Distribution by Mixing Graft Polyols having a Monomodal Particle Size Distribution (Table 2)

Graft polyols having a clearly separated bimodal particle size distribution were prepared by mixing graft polyols having a narrow, monomodal particle size distribution and different particle sizes. The mixing of the graft polyols was effected in a stirred container with a Vollrath disk stirrer. However, all known mixing methods (continuous or batchwise) may be used. Since air may be introduced into the mixture by the mixing, it is advantageous to begin the investigation of the graft polyol mixtures only 24 hours after preparation of the mixture.

Graft polyol mixtures prepared from graft polyols having a narrow, monomodal particle size distribution and virtually the same solids content and based on the same carrier polyol are shown in table 2, examples A-C. The dependence of the viscosity on the mixing ratio and hence on the ratio (% by volume) of small to large particles is clearly evident.

However, graft polyols having a monomodal particle size distribution which differ in the reactivity and the viscosity of the carrier polyol (table 2, D) were also used for the mixing. As a result of the different reactivity of the carrier polyols, it was simultaneously possible to influence the foaming behavior as a function of the mixing ratio. In this example, the viscosity of the graft polyol mixture was determined by the ratio of small to large particles and the ratio of the carrier polyols having different viscosities.

Example 4

Synthesis of Graft Polyols having a Bimodal Particle Size Distribution (Table 3)

Graft polyols having the novel, bimodal particle size distribution were also prepared directly by the semibatch process, the same reaction apparatus as in example 2 being used. Before the beginning of the reaction, the reactor was filled with a mixture of carrier polyol, macromer and a seed graft polyol, flushed with nitrogen and heated to a synthesis temperature of 125° C. The remaining part of the reaction mixture, consisting of further carrier polyol, initiator, the monomers and the reactor moderator, was initially taken in at least two metering containers. In some syntheses, only a part of the macromer was initially taken in the reactor and the remaining amount was metered into the reactor during the reaction via an independent metering stream. The beginning and end of the macromer metering are shown in table 3. The synthesis of the graft polyols was effected by transferring the raw materials from the metering containers at a constant metering rate into the reactor by means of a static in-line mixer. The duration of metering for the monomer/moderator mixture was 150 minutes, while the polyol/initiator mixture was metered into the reactor over 165 minutes. After a subsequent reaction time of a further 15 minutes at the reaction temperature, the crude graft polyol was transferred into a glass flask via the bottom discharge valve. The product was then freed from the unconverted monomers and other volatile compounds at 135° C. under reduced pressure (<0.1 mbar). The end product was finally stabilized with antioxidants.

TABLE 1

Synthesis of graft polyols (GP) having a monomodal particle size distribution

| Experiment number | GP 2 | GP 3 | GP 4 | GP 5 | GP 6 | GP 7 | GP 8 | GP 9 | GP 10 | GP 11 |
|---|---|---|---|---|---|---|---|---|---|---|
| Initially taken reaction mixture (g) | | | | | | | | | | |
| Polyol 1 | — | — | — | 396.44 | 387.76 | 387.67 | 396.56 | 395.42 | 365.11 | 367.07 |
| Polyol 2 | 570.67 | 571.83 | 360.64 | — | — | — | — | — | — | — |
| Macromer 1 | — | — | 23.67 | 20.90 | 21.54 | 21.54 | 17.79 | 21.01 | — | — |
| Macromer 2 | 24.82 | 23.17 | — | — | — | — | — | — | — | — |
| Macromer 3 | — | — | — | — | — | — | — | — | 2.75 | 1.00 |
| Graft polyol - name | — | — | GP 7 | — | — | — | — | GP 5 | — | — |
| - amount | | | 188.12 | | | | | 132.33 | | |
| Metering stream 1 (g) | | | | | | | | | | |
| Acrylonitrile | 183.85 | 183.85 | 207.65 | 184.31 | 189.91 | 189.91 | 185.25 | 185.25 | 203.38 | 203.45 |
| Styrene | 367.75 | 367.75 | 415.35 | 368.69 | 379.89 | 379.89 | 370.55 | 370.55 | 406.81 | 406.95 |
| Dodecanethiol | 5.57 | 5.57 | 6.54 | 5.81 | 5.98 | 6.21 | 5.84 | 5.61 | 6.41 | 6.41 |
| Metering stream 2 (g) | | | | | | | | | | |
| Polyol 1 | — | — | — | 421.30 | 412.07 | 411.98 | 421.43 | 420.21 | 388.00 | 390.09 |
| Polyol 2 | 244.57 | 245.07 | 383.25 | — | — | — | — | — | — | — |
| Initiator 1 | — | — | 2.90 | — | — | 2.80 | 2.58 | — | 2.84 | 2.84 |
| Initiator 2 | — | — | — | — | 2.85 | — | — | — | — | — |
| Initiator 3 | 2.76 | 2.76 | — | 2.54 | — | — | — | 1.95 | — | — |
| Metering stream 3 (g) | | | | | | | | | | |
| Macromer 3 | — | — | — | — | — | — | — | — | 24.71 | 22.20 |
| Metering time (min) | | | | | | | | | 10-30 | 20-30 |
| Total (g) | 1400.00 | 1400.00 | 1588.12 | 1400.00 | 1400.00 | 1400.00 | 1400.00 | 1532.33 | 1400.00 | 1400.00 |
| Graft polyol properties | | | | | | | | | | |
| Solids content (% by weight)* | 40.00 | 40.0 | 45.0/40.0 | 39.9 | 40.9 | 41.0 | 40.1 | 40.0 | 44.0 | 44.1 |
| Viscosity (mPa·s)* | 11200 | 9310 | 10420/6300 | 4640 | 4990 | 4950 | 4550 | 4120 | 5480 | 5250 |
| Particle size (mode value) (μm) | 0.2 | 0.35 | 0.9 | 0.3 | 0.35 | 0.35 | 0.5 | 0.8 | 0.9 | 1.1 |

TABLE 1-continued

Synthesis of graft polyols (GP) having a monomodal particle size distribution

| Experiment number | GP 2 | GP 3 | GP 4 | GP 5 | GP 6 | GP 7 | GP 8 | GP 9 | GP 10 | GP 11 |
|---|---|---|---|---|---|---|---|---|---|---|
| Amount of solids content of the graft polyol in the initially taken reaction mixture, based on solids content of the resulting graft polyol (%) | — | — | 10.79 | — | — | — | — | 8.61 | — | — |

*= Solids content or viscosity after synthesis/solids content or viscosity after dilution with further carrier polyol

TABLE 2

Graft polyol mixtures (GM) having a bimodal particle size distribution prepared from graft polyols having a monomodal particle size distribution

| Experimental series | Name of the mixture | Mixture of | Small particles of polyol A (% by weight) | Large particles of polyol B (% by weight) | Viscosity (mPa · s) |
|---|---|---|---|---|---|
| A | GM 1 |  | 0 | 100 | 4120 |
|  | GM 2 | Polyol A = GP 5 | 20 | 80 | 3610 |
|  | GM 3 | and | 30 | 70 | 3500 |
|  | GM 4 | Polyol B = GP 9 | 40 | 60 | 3570 |
|  | GM 5 |  | 50 | 50 | 3750 |
|  | GM 6 |  | 100 | 0 | 4640 |
| B | GM 7 |  | 0 | 100 | 6300 |
|  | GM 8 | Polyol A = GP 2 | 20 | 80 | 5130 |
|  | GM 9 | and | 30 | 70 | 4780 |
|  | GM 10 | Polyol B = GP 4 | 40 | 60 | 5050 |
|  | GM 11 |  | 50 | 50 | 5920 |
|  | GM 12 |  | 100 | 0 | 11200 |
| C | GM 13 |  | 0 | 100 | 6300 |
|  | GM 14 | Polyol A = GP 3 | 20 | 80 | 5200 |
|  | GM 15 | and | 30 | 70 | 5011 |
|  | GM 16 | Polyol B = GP 4 | 40 | 60 | 5150 |
|  | GM 17 |  | 50 | 50 | 5680 |
|  | GM 18 |  | 100 | 0 | 9310 |
| D | GM 19 |  | 0 | 100 | 6300 |
|  | GM 20 | Polyol A = GP 5 | 20 | 80 | 4880 |
|  | GM 21 | and | 30 | 70 | 4558 |
|  | GM 22 | Polyol B = GP 4 | 40 | 60 | 4518 |
|  | GM 23 |  | 50 | 50 | 4835 |
|  | GM 24 |  | 100 | 0 | 4640 |

TABLE 3

Synthesis of graft polyols having a bimodal particle size distribution

| Experiment number | GP 12 | GP 13 | GP 14 | GP 15 | GP 16 | GP 17 | GP 18 | GP 19 | GP 20 | GP 21 | GP 22 |
|---|---|---|---|---|---|---|---|---|---|---|---|
| Initially taken reaction mixture (g) | | | | | | | | | | | |
| Polyol 1 | 367.26 | 363.98 | 367.26 | 359.27 | 366.42 | 365.64 | — | — | 353.75 | — | — |
| Polyol 2 | — | — | — | — | — | — | 360.64 | 358.49 | — | 348.60 | 353.70 |
| Macromer 1 | 23.07 | 30.52 | 23.07 | 23.66 | 23.13 | 23.30 | 23.67 | 23.83 | — | — | — |
| Macromer 2 | — | — | — | — | — | — | — | — | — | — | — |
| Macromer 3 | — | — | — | — | — | — | — | — | 22.43 | 22.36 | 22.34 |
| Graft polyol - name | GP 5 | GP 5 | GP 5 | GP 5 | GP 7 | GP 8 | GP 7 | GP 8 | GP 10 | GP 10 | GP 11 |
| Graft polyol - amount | 22.90 | 81.66 | 98.91 | 87.47 | 85.06 | 121.72 | 86.61 | 124.50 | 110.59 | 109.54 | 115.28 |
| Metering stream 1 (g) | | | | | | | | | | | |
| Acrylonitrile | 203.45 | 203.45 | 203.45 | 208.58 | 203.91 | 204.38 | 207.65 | 209.05 | 208.11 | 212.78 | 212.78 |
| Styrene | 406.95 | 406.95 | 406.95 | 417.22 | 407.89 | 408.82 | 415.35 | 418.15 | 416.29 | 425.62 | 425.62 |
| Dodecanethiol | 6.17 | 6.17 | 6.17 | 6.57 | 6.42 | 6.44 | 6.54 | 6.59 | 6.56 | 6.70 | 6.70 |

TABLE 3-continued

Synthesis of graft polyols having a bimodal particle size distribution

| Experiment number | GP 12 | GP 13 | GP 14 | GP 15 | GP 16 | GP 17 | GP 18 | GP 19 | GP 20 | GP 21 | GP 22 |
|---|---|---|---|---|---|---|---|---|---|---|---|
| Metering stream 2 (g) | | | | | | | | | | | |
| Polyol 1 | 390.29 | 386.80 | 390.29 | 381.80 | 389.40 | 388.57 | — | — | 375.93 | — | — |
| Polyol 2 | — | — | — | — | — | — | 383.25 | 380.97 | — | 370.45 | 375.88 |
| Initiator 1 | — | — | — | — | 2.83 | 2.85 | 2.90 | 2.92 | 2.90 | 2.97 | 2.97 |
| Initiator 2 | — | — | — | — | — | — | — | — | — | — | — |
| Initiator 3 | 2.81 | 2.14 | 2.81 | 2.90 | — | — | — | — | — | — | — |
| Metering stream 3 (g) | | | | | | | | | | | |
| Macromer 3 | — | — | — | — | — | — | — | — | 14.04 | 10.52 | — |
| Metering time (min) | — | — | — | — | — | — | — | — | 10-20 | 10-17 | — |
| Total (g) | 1422.90 | 1481.66 | 1498.91 | 1487.47 | 1485.06 | 1521.72 | 1486.61 | 1524.50 | 1510.59 | 1509.54 | 1515.28 |
| Graft polyol properties | | | | | | | | | | | |
| Solids content (% by weight)* | 44.1/ 40.0 | 43.8/ 40.0 | 43.9/ 40.0 | 45.2/ 44.0 | 44.0/ 40.0 | 44.0 | 45.0/ 40.0 | 45.0 | 44.85 | 46.85 | 46.8 |
| Viscosity (mPa·s)* | 7630/ 4090 | 5580/ 3740 | 5370/ 3540 | 5890/ 5220 | 4880/ 3490 | 4820 | 8150/ 5010 | 8100 | 4720 | 8440 | 8590 |
| Small/large particles | | | | | | | | | | | |
| Particle size of the peaks (µm) | 0.3/0.8 | 0.2/0.7 | 0.3/0.8 | 0.3/0.8 | 0.3/0.8 | 0.3/0.8 | 0.3/0.8 | 0.3/0.8 | 0.3/0.8 | 0.3/1.3 | 0.3/1.8 |
| Volume fraction of the [lacuna] (%) | 73/27 | 40/60 | 20/80 | 30/70 | 30/70 | 30/70 | 30/70 | 30/70 | 30/70 | 30/70 | 35/65 |
| Amount of solids content of the graft polyol in the initially taken reaction mixture, based on solids content of the resulting graft polyol (%) | 1.46 | 5.02 | 6.00 | 5.19 | 5.34 | 7.29 | 5.31 | 7.28 | 7.18 | 6.82 | 7.17 |

*= Solids content or viscosity after synthesis/solids content or viscosity after dilution with further carrier polyol Comparison of the polyol and foam properties of graft polyols having a broad particle size distribution, monomodal particle size distribution and bimodal particle size distribution.

Polyol Properties

Graft polyols having a bimodal particle size distribution have a lower viscosity at a given solids content compared with graft polyols having a monomodal particle size distribution and graft polyols having a broad particle size distribution.

The graft polyols GP 1 and GP 19 are based on the same carrier polyol (polyol 2) and both have a solids content of 45% by weight. Nevertheless the graft polyol GP 19 having a bimodal particle size distribution with a viscosity of 8100 mPa·s has a viscosity which is about 38% lower compared with GP 1 having a broad particle size distribution and a viscosity of 13 000 mPa·s.

Also in comparison with graft polyols having a narrow monomodal particle size distribution, graft polyols having a bimodal particle size distribution have a lower viscosity. It is unimportant whether the bimodal particle size distribution has resulted from mixing of two graft polyols having a monomodal particle size distribution or directly during the synthesis.

FIG. 5 shows that the decrease in the viscosity is dependent on the volume fraction of the small and large particles in the particle size distribution. The experimental series B and C in table 2 also clearly show that the viscosity decreases to a minimum at 30% by volume of small particles and 70% by volume of large particles in the particle size distribution.

The decrease in the viscosity is at least 5%, particularly preferably from 12 to 30% (for example on comparison of GM 1 with GM 3 and GP 7 with GP 16) and reached up to 45% or more in some cases (for example on comparison of GP 2 and GP 3 with GP 18).

The novel graft polyols having a bimodal particle size distribution have a better flow behavior under shear load. This was clearly shown on filtration of the graft polyols or of the graft polyol mixtures. The filtration experiments were carried out on the 25 t scale using 3 filters connected in parallel, from Ronningen & Petter (type CF-1600) and multilayer filter inserts. The pore size of the filter inserts is shown in table 4.

TABLE 4

Comparison of the filterability of the graft polyols

|  | Graft polyol | |
| --- | --- | --- |
|  | GP 1 | GP 19 |
| Carrier polyol | Polyol 2 | |
| Solids content (% by weight) | 45.0 | 45.0 |
| Viscosity (mPa · s) | 13 000 | 8100 |
| Pore size of the filter (μm) | 50 × 50 | 25 × 25 |
| Filtration rate (t/h) | <1 | 4 |

|  | GP 7 | GP 17 |
| --- | --- | --- |
| Carrier polyol | Polyol 1 | |
| Solids content (% by weight) | 41 | 44 |
| Viscosity (mPa · s) | 4950 | 4820 |
| Pore size of the filter (μm) | 25 × 25 | 25 × 25 |
| Filtration rate (t/h) | 3 | 6 |

Owing to the lower viscosity and the bimodal particle size distribution, it was possible to purify the graft polyol GP 19 through filters which were 4 times finer (smaller pores) at a rate which was 4 times higher in comparison with graft polyol GP 1 having a broad particle size distribution (table 4). Both graft polyols are based on the same carrier polyol.

The graft polyols GP 7 (monomodal) and GP 17 (bimodal) have virtually the same viscosity. However, the solids content of GP 17 at this viscosity is 44% by weight while the graft polyol GP 7 contains only 41% by weight of solid. As shown in table 4, in spite of the higher solids content for GP 17, filtration was possible at a higher rate compared with GP 7.

With the same filter area, graft polyols having a bimodal particle size distribution have a higher filtration rate compared with graft polyols having a monomodal or broad particle size distribution. Conversely, however, it is also possible to realize comparable filtration rates in the case of graft polyols having the novel bimodal particle size distribution with smaller filter areas.

Example 5

Processing and Foam Properties

Formulations and Test Methods (Tables 5-8)

Graft polyols having the novel bimodal particle size distribution were compared with one another and with graft polyols having a monomodal or broad particle size distribution in flexible slabstock foam and flexible molded foam formulations. The raw materials used, the formulations for the respective foam types and the test methods for assessing the foaming behavior or the foam properties are shown in tables 5-8.

TABLE 5

Formulations and raw materials for testing unreactive
graft polyols in the flexible slabstock foam
(conventional slab foam)

| Formulation (data in parts by weight) | HLB I*) | HLB II**) |
| --- | --- | --- |
| Gross foam density (kg/m³) | 35 | 25 |
| Graft polyol GP/GM (cf. tables 1-3) + polyol 1 | 100.00 | 100.00 |
| Water | 2.90 | 4.30 |
| Tegostab B 4900[1)] | 0.95 | 1.00 |
| Lupragen N 201[2)] (3:1) | 0.14 | 0.10 |

TABLE 5-continued

Formulations and raw materials for testing unreactive
graft polyols in the flexible slabstock foam
(conventional slab foam)

| Formulation (data in parts by weight) | HLB I*) | HLB II**) |
| --- | --- | --- |
| Lupragen N 206[3)] | | |
| zinc octanoate | 0.18 | 0.24 |
| Lupranat T 80[4)] (Index) | 112 | 110 |

*)also see table 9
**)also see table 10
[1)]Silicone stabilizer, Goldschmidt AG
[2)]1,4-Diazabicyclo[2.2.2]octane, BASF AG
[3)]Bis(2-dimethylaminoethyl) ether, BASF AG
[4)]Toluene diisocyanate; 80% of 2,4- and 20% of 2,6-isomer, BASF

TABLE 6

Formulations and raw materials for testing reactive
graft polyols in the flexible slabstock foam (high
resilience slab foam)

| Formulation (data in parts by weight) | HR I*) | HR II*) | HR III*) |
| --- | --- | --- | --- |
| Graft polyol GP/GM (cf. tables 1-3): polyol 2 | 100.00 (25% or 15% solids content) | | |
| DEOA[1)] | 1.30 | 1.30 | 1.20 |
| Lupragen VP 9600[2)] | 2.00 | 2.00 | 1.00 |
| Water (total) | 2.50 | 2.50 | 2.50 |
| Tegostab B 4380[3)] | 1.00 | 1.00 | 1.00 |
| Lupragen N 201[4)] | 0.20 | 0.18 | 0.04 |
| Lupragen N 206[5)] | 0.03 | — | — |
| zinc octanoate | 0.12 | 0.15 | 0.18 |
| Lupranat T 80[6)] (Index) | 110 | 110 | 105 |

*)also see table 11
[1)]Diethanolamine as an 80% aqueous solution; BASF AG
[2)]Crosslinking agent, 75% aqueous mixture of different polyalcohols having primary OH groups; hydroxyl number: 650 mg KOH/g, viscosity at 25° C.: 480 mPa · s
[3)]Silicone stabilizer, Goldschmidt AG
[4)]1,4-Diazabicyclo[2.2.2]octane, BASF AG
[5)]Bis(2-dimethylaminoethyl) ether, BASF AG
[6)]Toluene diisocyanate, 80% of 2,4- and 20% of 2,6-isomer, BASF AG

TABLE 7

Formulations and raw materials for testing reactive
graft polyols in the flexible molded foam

| Raw materials (data in parts by weight) | FW I*) | FW II*) | FW III*) |
| --- | --- | --- | --- |
| Polyol 2 | 70.4 | 62.83 | 64.63 |
| Polyol 3 | 4 | 1.8 | — |
| Graft polyol (solid 45%) | 20.5 | 30.6 | 30.6 |
| DEOA[1)] | 0.8 | — | — |
| Glycerol | — | 0.3 | 0.3 |
| N 201[2)] | — | 0.51 | 0.51 |
| NAX A1[3)] | — | 0.11 | 0.11 |
| N 211[4)] | 0.3 | — | — |
| Dabco X 8154[5)] | 0.7 | — | — |
| Dabco XDM[6)] | 0.2 | — | — |
| Tegostab B 4690[7)] | 0.4 | — | — |
| Tegostab B 8680[8)] | — | 0.15 | 0.15 |
| Water | 2.7 | 3.1 | 3.1 |
| Isocyanate 1[9)] | 44.4 | — | — |
| Isocyanate 2[10)] | — | 41.1 | 41.1 |

*)also see table 12
[1)]Diethanolamine as an 80% strength aqueous solution, BASF AG
[2)]1,4-Diacabicyclo(2.2.2)octane, BASF AG
[3)]Catalyst, from Air Products
[4)]Dimethylaminopropylamine, BASF AG
[5)]Catalyst, from Air Products
[6)]Catalyst, from Air Products
[7)]Stabilizer, from Goldschmidt
[8)]Stabilizer, from Goldschmidt
[9)]Isocyanate mixture comprising 2,4-, 4,4'-MDI and PMDI, NCO content: 33% by weight
[10)]Isocyanate mixture comprising Lupranat° T 80 and PMDI, NCO content: 45% by weight

TABLE 8

Test for assessing the foaming behavior and the foam quality

| Test value | Condition | Dimension | Standard |
|---|---|---|---|
| Cell opening behavior COB | 1 = very strong 2 = strong 3 = moderate 4 = slight | Rating | |
| Density | | kg/m³ | DIN EN ISO 845 |
| COB | | | |
| Tensile strength | | kPa | DIN EN ISO 1798 |
| Elongation at break | | % | DIN EN ISO 1798 |
| Compressive strength | 40% compression | kPa | DIN EN ISO 3386 |
| Compression set | 70° C./22 h, 50% compression | % | DIN EN ISO 1856 |
| Wet compression set | 22 h/50° C./70%/95% LF | % | ISO 1856 (-mod.) |
| Resilience | Pendulum test | % | DIN 53573 |
| Tear propagation strength | | N/mm | DIN 53515 |
| Indentation hardness, method B | 40% compression | N | DIN EN ISO 2439, B |
| Compressive strength | | kPa | DIN EN ISO 3386-1/2 |
| SAG factor | | — | Ratio of indentation hardness at 65% to indentation hardness at 25% |
| Open cell character | | N | Measure of the force required for compressing an unflexed test cushion to 65% (3 × 1 compression at 65% with test plate diameter of 200 mm) |
| Fogging | Gravimetric method | mg | DIN 75201B |
| VOC | Determination of gaseous and condensible emissions by means of automatic thermodesorption | ppm | DaimlerChrysler test instructions "Analysis of the emission of volatile and condensable substances from vehicle interior trim materials by means of thermodesorption" No. PB VWL 709 - issue: 01.11.2001 or VDA 278 |
| Fogging | | ppm | |

Tables 9-12 show the results of the foam investigations. Graft polyols having the novel bimodal particle size distribution and having a broad or monomodal particle size distribution in slabstock foam and flexible molded foam formulations were compared with one another.

Example 5.1

Results for Slabstock Foam (Tables 9-11)

With the use of the graft polyols having the novel, bimodal particle size distribution in comparison with graft polyols having broad and having monomodal particle size distributions in the formulations HLB I and HLB II, the foam properties scarcely differed. However, an enhanced cell opening behavior was observed, which, however, has no influence on the curing phase and the final stability of the foams (tables 9 and 10). The graft polyols having the novel bimodal particle size distribution can be foamed over a wide zinc octanoate range under a very wide range of external conditions which usually require adaptations of the formulation, without any tendency to shrinkage or cracking being observable.

In the HR slabstock foam (HR I), too, the foaming behavior and the foam properties of GP 1 and GP 4 differed only slightly in comparison with GP 18, GP 19 and GM 14, GM 15. What was striking was the stronger cell opening behavior of the bimodal graft polyols GP 18, GP 19 and GM 14, GM 15 in comparison with GP 1 and GP 4, which is probably due to the changed particle size distribution. In order to avoid instability of the foam blocks at the moment of cell opening, preventive measures were taken with respect to the activation by optimizing the formulation (ratio of blowing catalysis to crosslinking catalysis changed, HR I was converted into HR II). The strong cell opening has the positive result that the effort required for flexing the foams, which serves for subsequent and complete cell opening, can be reduced and the further processing process can be facilitated. Even better results with regard to the process parameters were obtained if the crosslinking agents are corrected in a downward direction (HR III).

In addition to the good process range, a greater hardness is achieved in the case of GP 21 at the same solids content, with the result that it is possible to reduce the solids content and/or the TDI index, which leads to a saving in both cases. The fact that the wet compression set decreases and the SAG factor increases is also to be rated positively.

Graft polyols (unreactive) having the novel bimodal particle size distribution have improved filtration behavior. In comparison with GP 7 (monomodal), GP 17 (bimodal) could be processed on a liquid $CO_2$ foaming machine of the NovaFlex type without indication of any significant pressure increase in the mixing head of the machine.

TABLE 9

Testung of unreactive graft polyols having a monomodal and bimodal particle size
distribution in the slabstock foam (formulation HLB I)

| | GP 5 | GP 6 | GP 7 | GP 15 | GM 3 | GP 16 | GP 17 | GP 20 |
|---|---|---|---|---|---|---|---|---|
| Formulation HLB I *) with | | | | | | | | |
| Solids content GP/GM (% by weight) | 39.9 | 40.9 | 41.0 | 45.2 | 40.0 | 44.0 | 44.0 | 44.85 |
| Viscosity at 25° C. (mPa · s) | 4640 | 4990 | 4950 | 5890 | 3500 | 4880 | 4820 | 4720 |
| Graft polyol GP/GM + polyol 1 **) | 100 | 100 | 100 | 100 | 100 | 100 | 100 | 100 |
| Solids content of the mixture (% by weight) | 10 | 10 | 10 | 10 | 10 | 10 | 10 | 10 |
| Formulation changes | none | none | 0.14 N 201, without N 206 | none | none | 0.20 MT zinc octanoate | 0.21 MT zinc octanoate | 0.21 MT zinc octanoate |
| Foaming properties | blown off, COB 2 | blown off, COB 2 | blown off, COB 3 | thoroughly blown off, COB 1 | thoroughly blown off, COB 2 | moderately blown off, COB 3 | thoroughly blown off, COB 3 | thoroughly blown off, COB 3 |
| Foam properties | | | | | | | | |
| Density | 31.0 | 31.0 | 31.9 | 30.6 | 31.1 | 30.9 | 30.3 | 31.0 |
| Compressive strength | 5.1 | 5.9 | 5.4 | 5.5 | 5.4 | 5.5 | 6.3 | 6.4 |
| Tensile strength | 88 | 100 | 103 | 100 | 102 | 94 | 98 | 93 |
| Elongation at break | 91 | 99 | 110 | 104 | 106 | 98 | 87 | 78 |
| Compression set | 3.0 | 2.0 | 0.6 | 2.5 | 2.3 | 2.0 | 2.2 | 1.4 |
| Wet compression set | 5.0 | 3.4 | 1.6 | 3.3 | 3.1 | — | 4.3 | 3.8 |
| Resilience | 46 | 48 | 48 | 47 | 47 | 36 | 52 | 51 |
| Fogging (DIN) | ø 0.2 | ø 0 | ø 0.4 | ø 0.3 | ø 0.3 | ø 0.7 | — | ø 0.3 |
| VOC | ø 358 | ø 354 | ø 350 | ø 287 | ø 300 | ø 338 | — | ø 386 |
| Fogging | ø 30 | ø 22 | ø 50 | ø 20 | ø 32 | ø 117 | — | ø 55 |

*) For formulation, cf. table 5
**) Data in parts by weight

TABLE 10

Testing of unreactive graft polyols having a monomodal and bimodal particle size
distribution in the slabstock foam (formulation HLB II)

| | GP 5 | GP 6 | GP 7 | GP 15 | GM 3 | GP 16 | GP 17 | GP 20 |
|---|---|---|---|---|---|---|---|---|
| Formulation HLB II *) with | | | | | | | | |
| Solids content GP/GM (% by weight) | 39.9 | 40.9 | 41.0 | 45.2 | 40.0 | 44.0 | 44.0 | 44.85 |
| Viscosity at 25° C. (mPa · s) | 4640 | 4990 | 4950 | 5890 | 3500 | 4880 | 4820 | 4720 |
| Graft polyol GP/GM + polyol 1 **) | 100 | 100 | 100 | 100 | 100 | 100 | 100 | 100 |
| Solids content of the mixture (% by weight) | 10 | 10 | 10 | 10 | 10 | 10 | 10 | 10 |
| Formulation changes | none | none | none | none | none | none | none | 0.20 MT zinc octanoate |
| Foaming properties | thoroughly blown off, COB 2 | thoroughly blown off, COB 1 | blown off, COB 3 | thoroughly blown off, COB 2 | thoroughly blown off, COB 2 | thoroughly blown off, COB 3 | thoroughly blown off, COB 2 | thoroughly blown off, COB 2 |
| Foam properties | | | | | | | | |
| Density | 22.2 | 22.2 | 22.4 | 21.8 | 22.0 | 22.0 | 22.1 | 22.2 |
| Compressive strength | 6.4 | 6.0 | 5.4 | 5.5 | 5.7 | 5.7 | 5.6 | 6.1 |
| Tensile strength | 94 | 95 | 98 | 97 | 100 | 97 | 99 | — |
| Elongation at break | 82 | 88 | 98 | 98 | 100 | 85 | 92 | — |
| Compression set | 3.7 | 4.0 | 3.1 | 3.7 | 3.6 | 4.7 | 4.1 | — |
| Wet compression set | 16.0 | 10.0 | 7.6 | 13.8 | 13.0 | — | 10.2 | 9.5 |
| Resilience | 36 | 34 | 36 | 37 | 40 | 34 | 36 | 40 |
| Fogging (DIN) | ø 0.3 | ø 0.1 | ø 0.3 | ø 0.2 | ø 0.2 | ø 0.4 | ø 0.3 | — |

*) For formulation, cf. table 5
**) Data in parts by weight

TABLE 11

Testing of reactive graft polyols having a monomodal and bimodal particle size
distribution in the flexible slabstock foam (formulations HR I to HR III)

| Experiment number | GP 1 | GP 4 | GP 18 | GP 15 | GP 19 | GM 14 | GP 21 |
|---|---|---|---|---|---|---|---|
| Solids content GP/GM (% by weight) | 45.0 | 45.0 | 45.0 | 40.0 | 45.0 | 40.2 | 46.85 |

TABLE 11-continued

Testing of reactive graft polyols having a monomodal and bimodal particle size
distribution in the flexible slabstock foam (formulations HR I to HR III)

| Experiment number | GP 1 | GP 4 | GP 18 | GP 15 | GP 19 | GM 14 | GP 21 |
|---|---|---|---|---|---|---|---|
| Viscosity at 25° C. (mPa · s) | 13 000 | 10 420 | 8150 | 5010 | 8100 | 5200 | 8440 |
| Graft polyol GP/GM + polyol 2 **) | 100 | 100 | 100 | 100 | 100 | 100 | 100 |
| Solids content of mixture (% by weight) | 25 | 25 | 15 | 15 | 15 | 25 | 15 | 25 |
| Formulation *) | HR I | HR III | HR II | HR I | HR II | HR II | HR II | HR III |
| Formulation changes | — | — | — | 0.10 Sn octanoate | — | 0.12 Sn octanoate | — | 0.16 Sn octanoate |
| Foaming properties | thoroughly blown off, minimum settling, COB 3 | blows off strongly to well, minimum settling; COB 2 . . . 4 | | very thoroughly blown off, scarcely settled; COB 1 | blown off, little settling; COB 2 | thoroughly blown off, little settling; COB 3 | thoroughly blown off, slight settling; COB 2 | very slightly blown off, COB 4 |
| Foam properties | | | | | | | | |
| Density | 36.0 | 35.4 | 35.1 | 37.5 | 37.1 | 37.2 | 36.1 | 36.9 | 35.7 |
| Indentation hardness B | 122 | 142 | 108 | 115 | 107 | 112 | 128 | 117 | 176 |
|  | 169 | 200 | 147 | 162 | 152 | 155 | 176 | 165 | 240 |
|  | 329 | 433 | 309 | 322 | 309 | 317 | 335 | 325 | 519 |
| SAG factor | 2.7 | 3.00 | 2.86 | 2.80 | 2.89 | 2.83 | 2.62 | 2.78 | 2.95 |
| Compressive strength | 3.1 | 5.2 | 3.8 | 2.9 | 2.9 | 3.0 | 3.3 | 3.1 | 5.7 |
| Tensile strength | 123 | 135 | 128 | 122 | 125 | 123 | 152 | 121 | 135 |
| Elongation at break | 145 | 85 | 110 | 128 | 145 | 132 | 159 | 122 | 97 |
| Compression set | 2.0 | 3.5 | 3.4 | 4.6 | 4.8 | 4.6 | 4.3 | 3.4 | 3.4 |
| Wet compression set | 15.5 | 17.0 | 20.1 | 17.3 | 40.0 | 20.0 | 13.6 | 15.3 | 13.4 |
| Resilience | 62 | 60 | 61 | 64 | 62 | 63 | 63 | 63 | 63 |
| Fogging (DIN) | ø 0.9 | ø 1.1 1.8 . . . 0.6 | — | — | ø 1.1 | ø 0.7 | ø 2.1 | — | ø 0.7 |
| VOC | ø 375 | ø 540 | — | ø 260 | ø 416 | ø 300 | ø 670 | ø 313 | — |
| Fogging | ø 193 | ø 402 | — | ø 218 | ø 586 | ø 316 | ø 210 | ø 231 | — |

*) For formulations, cf. table 6
**) Data in parts by weight

Example 5.2

Results for Molded Foam (Table 12)

In complicated shaped articles graft polyols having a novel bimodal distribution (GP 18, GP 19, GP 21, GM 14, GM 15) showed better flow behavior in comparison with graft polyol GP 1 having a broad distribution. This led to fewer air inclusions in the case of complicated mold geometries.

As in the case of the flexible slabstock formulations, stronger cell opening behavior in comparison with graft polyol GP 1 was also observed in the case of the flexible molded foams with use of the graft polyols having a novel bimodal particle size distribution owing to the stronger cell opening behavior the cell opener polyol 3 (i.e. polyols which have a substantially increased content of ethylene oxide groups in the polymer chain) could be reduced from 4 parts (formulation FW I) to 1.8 parts (formulation FW II) to 0 parts (formulation FW III) in the example formulations (table 7). The foams based on graft polyols having a novel bimodal particle size distribution did not differ substantially from foams based on GP 1 in the foam parameters. By reducing the amount of cell opener, it was possible to achieve an increase in the hardness and a slight improvement in the tear propagation strength (cf. GP 18, FW I, FW II, FW III) (table 12). Both the foaming behavior and the foam properties showed no significant differences between graft polyols whose bimodal particle size distribution was obtained by mixing of graft polyols having a monomodal distribution (GM 15) or by synthesis (GP 18, GP 19).

TABLE 12

Testing of reactive graft polyols having monomodal and bimodal
particle size distribution in the flexible molded foam
(formulations FW I to FW III)

| | Graft polyol sample | | | | | | | | | | |
|---|---|---|---|---|---|---|---|---|---|---|---|
| | GP 1 | | GP 18 | | | GM 15 | | GP 19 | GM 14 | | GP 21 |
| Formulation *) | FW I | FW II | FW I | FW II | FW III | FW I | FW II | FW I | FW I | FW II | FW II |
| Foam parameters | | | | | | | | | | | |
| Density | 58.6 | 48.2 | 59.3 | 49.6 | 48.6 | 59 | 49.1 | 58.8 | 59.6 | 58 | 59 |
| Elongation at break | 112 | 110 | 120 | 100 | 100 | 125 | 105 | 115 | 125 | 110 | 105 |
| Tensile strength | 135 | 170 | 150 | 140 | 150 | 170 | 170 | 135 | 145 | 145 | 150 |
| Tear propagation strength | 0.529 | 0.527 | 0.514 | 0.521 | 0.543 | 0.568 | 0.543 | 0.526 | 0.509 | 0.516 | 0.538 |
| Compressive strength 40% | 7.3 | 6.4 | 7.0 | 7.2 | 7.4 | 6.8 | 6.5 | 7.2 | 6.9 | 7.1 | 7.5 |

TABLE 12-continued

Testing of reactive graft polyols having monomodal and bimodal particle size distribution in the flexible molded foam (formulations FW I to FW III)

| | Graft polyol sample | | | | | | | | | | |
|---|---|---|---|---|---|---|---|---|---|---|---|
| | GP 1 | | GP 18 | | | GM 15 | | GP 19 | GM 14 | | GP 21 |
| Formulation *) | FW I | FW II | FW I | FW II | FW III | FW I | FW II | FW I | FW I | FW II | FW II |
| Compression set | 3.7 | 3.5 | 3.9 | 3.6 | 4.0 | 4.0 | 3.5 | 3.6 | 4.0 | 3.6 | 4.0 |
| Resilience | 64 | 70 | 63 | 69 | | 63 | 70 | 64 | 63 | 68 | 65 |
| Open cell character | | | | | | | | | | | |
| 1st compression | 588 | 401 | 420 | 124 | 375 | 382 | 216 | 443 | 430 | 165 | 429 |
| 2nd compression | 456 | 280 | 330 | 124 | 286 | 296 | 178 | 352 | 356 | 136 | 334 |
| 3rd compression | 414 | 244 | 310 | 130 | 235 | 274 | 180 | 310 | 324 | 140 | 314 |

*) For formulations, cf. table 7

We claim:

1. A graft polyol comprising
small particles having a particle diameter of from 0.05 to 0.7 μm and
large particles having a particle diameter of 0.4 to 5.0 μm, wherein said large particles have a larger particle size than said small particles, and
wherein the graft polyol has a bimodal particle size distribution,
the peaks of the large and small particles measured by the Fraunhofer diffraction method in combination with polarization intensity differential scattering do not overlap, and
the graft polyol has a total solids content of from 5 to 65% by weight
wherein the total content of the solids consists of a volume fraction of from 5 to 45% of the small particles and a volume fraction of from 95 to 55% of the large particles, wherein the volume fractions of the small and large particles sum up to 100%.

2. The graft polyol as claimed in claim 1, wherein the peak of the small particles, measured by the Fraunhofer diffraction method in combination with polarization intensity differential scattering, begins in a range of from 0.05 to 0.08 μm and ends in a range of from 0.4 to 0.7 μm and the peak of the large particles, measured by the Fraunhofer diffraction method in combination with polarization intensity differential scattering, begins in a range of from 0.4 to 1.0 μm and ends in a range of from 1.2 to 5.0 μm.

3. The graft polyol as claimed in claim 1, wherein the small particles have a diameter of from 0.1 to 0.5 μm and the large particles have a diameter of from 0.5 to 4.0 μm.

4. The graft polyol as claimed in claim 1, wherein the total solids content of the graft polyol is from 10 to 50% by weight.

5. The graft polyol as claimed in claim 1, wherein the total content of the solids consists of a volume fraction of from 10 to 40% by weight of the small particles and a volume fraction of from 90 to 60% by weight of the large particles, wherein the volume fractions of the small and large particles sum up to 100%.

6. A process for the preparation of the graft polyols as claimed in claim 1 comprising:
mixing (i) at least one graft polyol having a monomodal particle size distribution with small particles which have a diameter of from 0.05 to 0.7 μm with (ii) at least one graft polyol having a monomodal particle size distribution with large particles which have a diameter of from 0.4 to 5.0 μm to form a graft polyol having a bimodal particle size distribution wherein the total solids content of the graft polyol having a bimodal particle size distribution consists of a volume fraction of from 5 to 45% of small particles and a volume fraction of from 95 to 55% of large particles, wherein the volume fractions of the small and large particles sum up to 100%.

7. The process as claimed in claim 6, wherein the small particles have a particle diameter of from 0.1 to 0.5 μm.

8. The process as claimed in claim 6, wherein the large particles have a particle diameter of from 0.5 to 4.0 μm.

9. The process as claimed in claim 6, wherein the graft polyol having a bimodal particle size distribution has from 10 to 40% by volume of the graft polyol having a monomodal particle size distribution with small particles and from 90 to 60% of the graft polyol having a monomodal particle size distribution of large particles, wherein the volume fractions of the graft polyols having a monomodal particle size distribution with small and large particles sum up to 100%.

10. A process for the preparation of a graft polyol having a bimodal particle size distribution comprising
small particles having a particle diameter of from 0.05 to 0.7 μm and
large particles having a particle diameter of 0.4 to 5.0 μm, wherein said large particles have a larger particle size than said small particles, and
wherein the graft polyol has a bimodal particle size distribution,
the peaks of the large and small particles measured by the Fraunhofer diffraction method in combination with polarization intensity differential scattering do not overlap, and
the graft polyol has a total solids content of from 5 to 65% by weight
wherein the total content of the solids consists of a volume fraction of from 5 to 45% of the small particles and a volume fraction of from 95 to 55% of the large particles, wherein the volume fractions of the small and large particles sum up to 100%
comprising preparing graft polyols in a semibatch process, wherein the initially taken reaction mixture contains in each case at least one carrier polyol, a macromer and a graft polyol having a monomodal particle size distribution, more than 3% by weight of the solids content in the resulting graft polyol consisting of the solids content of the graft polyol used in the initially taken reaction mixture and having a monomodal particle size distribution, and the amount of the macromer used in the initially taken reaction mixture is from 1 to 30% by weight, based on the total weight of the ethylenically unsaturated monomers wherein the amount is sufficient to form small particles in the further course of the reaction.

11. A process as claimed in claim 10, wherein the amount of macromer used in the initially taken reaction mixture is from 2 to 15% by weight, based on the amount of the ethylenically unsaturated monomers.

12. A process as claimed in claim 10, wherein the macromer is a polyol having an average molecular weight of more than 2 000 g/mol and a functionality of $\geq 2$, wherein said macromer has at least one terminal, polymerizable, ethylenically unsaturated group.

13. A process as claimed in claim 12, wherein the macromer is a polyol having an average molecular weight of more than 3 000 g/mol.

14. A polyurethane which comprises the graft polyol as claimed in claim 1.

15. A process for the preparation of polyurethanes comprising reacting (a) organic and/or modified organic polyisocyanates with (b) graft polyols and, optionally (c) additional compounds having hydrogen atoms reactive toward isocyanates, in the presence of (d) catalysts, (e) optionally water and/or other blowing agents and, optionally (f) additional assistants and additives, wherein the (b) graft polyols have a bimodal particle size distribution and a total solids content of from 5 to 65% by weight, which comprises small particles having a diameter of from 0.05 to 0.7 μm and large particles having a diameter of from 0.4 to 5.0 μm wherein said large particles have a larger particle size than said small particles, the peaks of the large and small particles measured by the Fraunhofer diffraction method in combination with polarization intensity differential scattering do not overlap, and the total content of solids consists of a volume fraction of from 5 to 45% of the small particles and a volume fraction of from 95 to 55% of the large particles, wherein the volume fractions of the small and large particles sum up to 100%.

* * * * *